(12) United States Patent
Togari et al.

(10) Patent No.: US 11,973,688 B2
(45) Date of Patent: Apr. 30, 2024

(54) CONTROL APPARATUS, NETWORK CONTROL METHOD AND PROGRAM

(71) Applicant: NIPPON TELEGRAPH AND TELEPHONE CORPORATION, Tokyo (JP)

(72) Inventors: Yukihiro Togari, Tokyo (JP); Shingo Okada, Tokyo (JP); Hisashi Kojima, Tokyo (JP); Takafumi Hamano, Tokyo (JP)

(73) Assignee: NIPPON TELEGRAPH AND TELEPHONE CORPORATION, Tokyo (JP)

( * ) Notice: Subject to any disclaimer, the term of this patent is extended or adjusted under 35 U.S.C. 154(b) by 0 days.

(21) Appl. No.: 18/258,929

(22) PCT Filed: Jan. 13, 2021

(86) PCT No.: PCT/JP2021/000920
§ 371 (c)(1),
(2) Date: Jun. 22, 2023

(87) PCT Pub. No.: WO2022/153413
PCT Pub. Date: Jul. 21, 2022

(65) Prior Publication Data
US 2024/0048488 A1    Feb. 8, 2024

(51) Int. Cl.
*H04L 45/76* (2022.01)
*H04L 12/46* (2006.01)

(52) U.S. Cl.
CPC .......... *H04L 45/76* (2022.05); *H04L 12/4633* (2013.01)

(58) Field of Classification Search
CPC .......................... H04L 45/76; H04L 12/4633
See application file for complete search history.

(56) References Cited

U.S. PATENT DOCUMENTS

| | | | |
|---|---|---|---|
| 2005/0071211 A1* | 3/2005 | Flockhart | H04M 3/523 705/28 |
| 2015/0263866 A1* | 9/2015 | Tsuchiya | H04L 12/4633 370/360 |
| 2018/0241812 A1* | 8/2018 | Marchetti | H04L 67/1023 |

OTHER PUBLICATIONS

The Telecommunication Technology Committee, "Common interconnection interface between IMS operator's networks", TTC Standard JJ-90.30 7th edition, May 21, 2020.
David Lebrun, "Reaping the Benefits of IPV6 Segment Routing", Sep. 2017.
Vincent Bernat, "IPv6 route lookup on Linux", Aug. 20, 2017, https://vincent.bernat.ch/en/blog/2017-ipv6-route-lookup-linux.

* cited by examiner

*Primary Examiner* — Chris Parry
*Assistant Examiner* — Dixon F Dabipi
(74) *Attorney, Agent, or Firm* — IPUSA, PLLC

(57) ABSTRACT

A control device that controls a communication system in which a network device and a virtual network device on a cloud communicate with each other through a tunnel, the control device including: a calculation unit that calculates a predicted value of the number of future setting entries in the virtual network device; an autoscale execution unit that executes scale-out or scale-in of the virtual network device on the basis of a result of comparison between the predicted value and a threshold; and a control unit that performs routing control between an application and the virtual network device in a service platform on the cloud.

9 Claims, 27 Drawing Sheets

Fig. 15

FIB ENTRY DB

| vCPE ID | NUMBER OF FIB ENTRIES | TIMESTAMP |
|---|---|---|
| vCPE1 | 400,000 | 09252200 |
| vCPE2 | 350,000 | 09252200 |
| vCPE3 | 100,000 | 09252200 |

Fig. 17

NUMBER-OF-CLIENTS STATISTICAL INFORMATION DB

|  | TIME SERIES 1 | TIME SERIES 2 |
|---|---|---|
| TIME PERIOD 1 | NUMBER OF NEW CONNECTIONS 100 | NUMBER OF NEW CONNECTIONS 200 |
| TIME PERIOD 2 | NUMBER OF NEW CONNECTIONS 100 | NUMBER OF NEW CONNECTIONS 100 |
| TIME PERIOD 3 | NUMBER OF NEW CONNECTIONS 300 | NUMBER OF NEW CONNECTIONS 300 |

Fig. 18

METRIC CALCULATION PARAMETER DB

| PARAMETER | VALUE |
|---|---|
| TIME WIDTH | M MINUTES |
| ABANDONMENT RATE WITHIN M MINUTES | S% |
| PREDICTION MODEL | ARIMA MODEL |
| HYPERPARAMETER OF PREDICTION MODEL | (p, d, q) = (1, 0, 0) |

Fig. 20

AUTOSCALE PROCESSING UNIT PARAMETER DB

| PARAMETER | VALUE |
|---|---|
| UPPER LIMIT OF NUMBER OF FIB ENTRIES | 400,000 |
| RATIO OF THRESHOLD | 75% |
| ... | ... |

Fig. 22

SETTING POLICY DETERMINATION PARAMETER DB

| PARAMETER | VALUE |
|---|---|
| SELECTION POLICY AFTER BALANCING | POLICY 2 |
| UPPER LIMIT OF NUMBER OF FIB ENTRIES | 400,000 |
| ... | ... |

CONTROL APPARATUS, NETWORK CONTROL METHOD AND PROGRAM

TECHNICAL FIELD

The present invention relates to a technology for performing control on a communication system that performs tunneling communication between network devices.

BACKGROUND ART

An E2E overlay technology for connecting customer premises equipment (CPE) and virtual customer premises equipment (vCPE) through a tunnel has been studied assuming a use case such as mobility as a service (MaaS).

Here, the CPE corresponds to, for example, a gateway (GW) on a mobile client terminal such as an automobile. The vCPE corresponds to a GW of a service platform on the cloud and relays communication with a plurality of application containers.

CITATION LIST

Non Patent Literature

Non Patent Literature 1: TTC, JJ-90.30 "Common interconnection interface between IMS operator's networks" https://vincent.bernat.ch/en/blog/2017-ipv6-route-lookup-linux Non Patent Literature 2: Reaping the Benefits of IPv6 Segment Routing, September 2017, ICTEAM

SUMMARY OF INVENTION

Technical Problem

In the communication system in which the CPE and the vCPE on the cloud are connected through a tunnel as described above, it is expected that, in a use case where an enormous number of clients are connected such as MaaS, it is necessary to set, for example, an enormous number of forwarding information base (FIB) entries corresponding to the number of clients in the vCPE.

However, when the number of settings per vCPE becomes enormous, it takes time to look up the FIB or insert a new entry. Thus, throughput may decrease.

The present invention has been made in view of the above points, and an object thereof is to provide a technology capable of avoiding a decrease in throughput even when the number of clients increases in a communication system in which a CPE and a vCPE on the cloud are connected through a tunnel.

Solution to Problem

The disclosed technology provides a control device that controls a communication system in which a network device and a virtual network device on a cloud communicate with each other through a tunnel, the control device including:
- a calculation unit that calculates a predicted value of the number of future setting entries in the virtual network device;
- an autoscale execution unit that executes scale-out or scale-in of the virtual network device on the basis of a result of comparison between the predicted value and a threshold; and
- a control unit that performs routing control between an application and the virtual network device in a service platform on the cloud.

Advantageous Effects of Invention

According to the present invention, it is possible to provide a technology capable of avoiding a decrease in throughput even when the number of clients increases in a communication system in which a CPE and a vCPE on the cloud are connected through a tunnel.

BRIEF DESCRIPTION OF DRAWINGS

FIG. 9 illustrates an example of scale-in.

FIG. 13 illustrates intra-cluster routing at the time of scale-in.

FIG. 15 illustrates an example of a FIB entry DB.

FIG. 17 illustrates an example of a number-of-clients statistical information DB.

FIG. 18 illustrates an example of a metric calculation parameter DB.

FIG. 20 illustrates an example of an autoscale processing unit parameter DB.

FIG. 22 illustrates an example of a setting policy determination unit parameter DB.

DESCRIPTION OF EMBODIMENTS

Hereinafter, an embodiment of the present invention (present embodiment) will be described with reference to the drawings. The embodiment described below is merely an example, and embodiments to which the present invention is applied are not limited to the following embodiment.

(E2E Overlay Technology)

The technology according to the present embodiment is based on the E2E overlay technology. Thus, first, an overview of the E2E overlay technology will be described. A destination to which the present invention is applied is not limited to the E2E overlay technology. The technology according to the present invention is also applicable to a tunneling protocol other than the E2E overlay technology.

Figure 1:
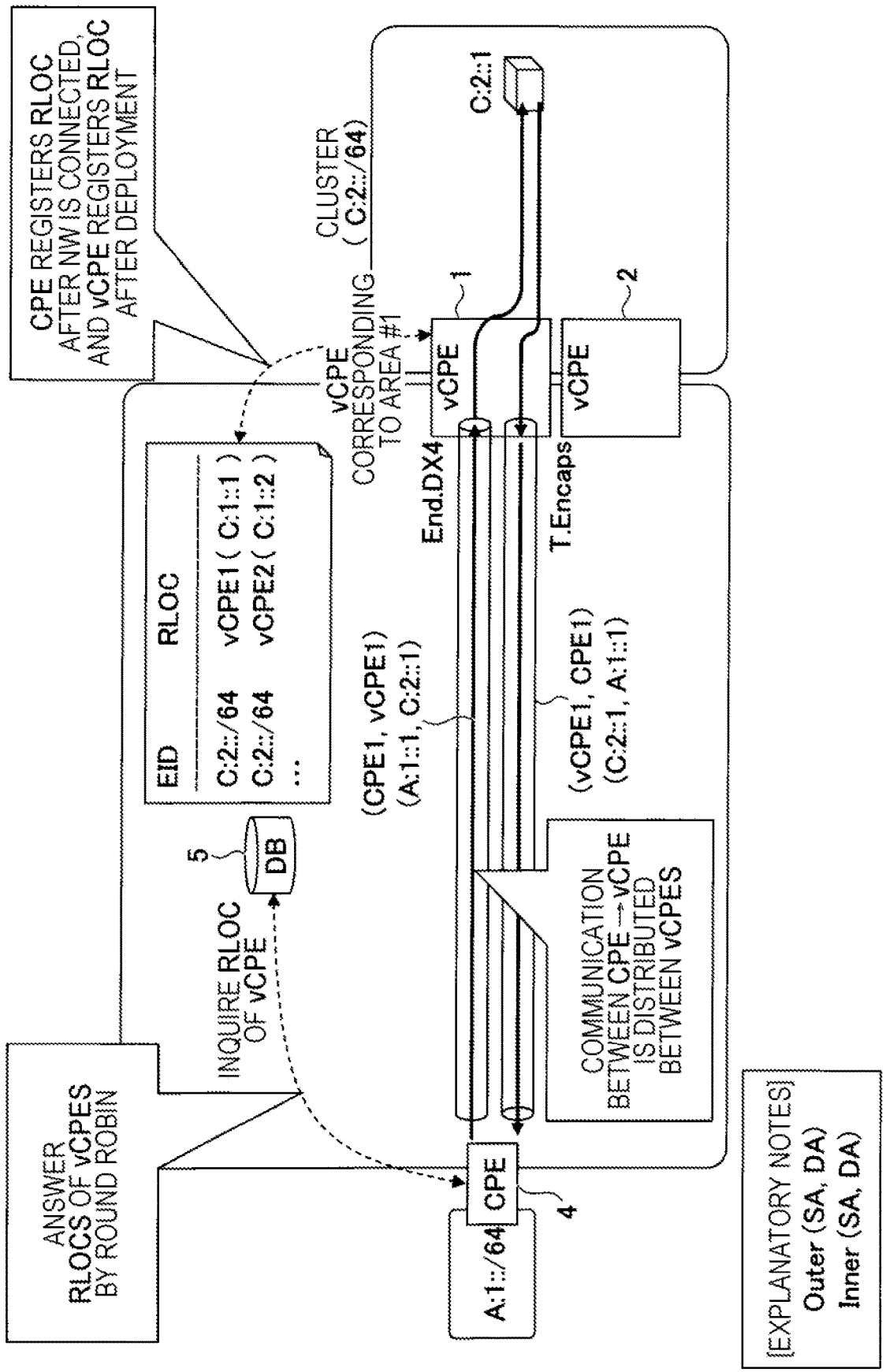
FIG. 1 illustrates a configuration example of a system using an E2E overlay technology in the present embodiment.

The E2E overlay technology is a technology for seamlessly connecting a client and a service platform, without being conscious of a state of an underlay. FIG. 1 illustrates an example of a system configuration using the E2E overlay technology. In the system in FIG. 1, there are a vCPE 1, a vCPE 2, a CPE 4, and a database (DB) 5. The CPE 4 is a network (NW) device that starts and terminates tunneling. The vCPEs 1 and 2 are containerized CPEs that operate in a service platform on the cloud. The vCPEs may also be referred to as virtual network devices.

The vCPE 1 and the vCPE 2 exist in a cluster. The cluster is a service platform (e.g. Kubernetes cluster) on the cloud managed by a service provider.

As illustrated in FIG. 1, SRv6-based tunneling is performed between the CPE 4 and the vCPE 1. A device (client) under the CPE 4 or a container (application) under the vCPE 1 transmits a packet to an endpoint identifier (EID) space of each other, but, in the CPE 4/vCPE 1, the packet is encapsulated by using an address of an opposing routing locator (RLOC). Here, the EID is an IP address of an application or a terminal (client), and the RLOC is an IP address on a wide area network (WAN) side that terminates tunneling.

As illustrated in FIG. 1, the DB 5 responds to an inquiry from the CPE 4 with the RLOC of the vCPE 1. Note that the CPE registers the RLOC in the DB 5 after the NW is connected, and the vCPE registers the RLOC in the DB 5 after deployment.

In a case where there are a plurality of vCPEs, the DB 5 achieves distribution of traffic by answering RLOCs of the vCPEs by round robin.

(Assumption of Use Case)

In the E2E overlay technology in FIG. 1, the present embodiment assumes a MaaS use case, and the following assumptions are made for a CPE, application, and vCPE forming a service.

The CPE corresponds to a gateway on a mobile client terminal such as an automobile, and several million CPEs are assumed to exist. The application is assumed to be subjected to autoscaling according to the number of client terminals such as automobiles.

The vCPE corresponds to a gateway of the service platform (cluster) on the cloud and relays communication to/from a plurality of application containers (app pod). A tunneling setting is learned when communication is performed in a CPE direction, and the scale of the setting is assumed to be 64 encapsulation settings×one million rows. An unused tunneling setting is deleted. Specifically, for example, the settings are managed based on time to live (TTL), and a setting in which the TTL has become zero is deleted. Note that the pod is a set of containers that provide the same function (service).

Figure 2:
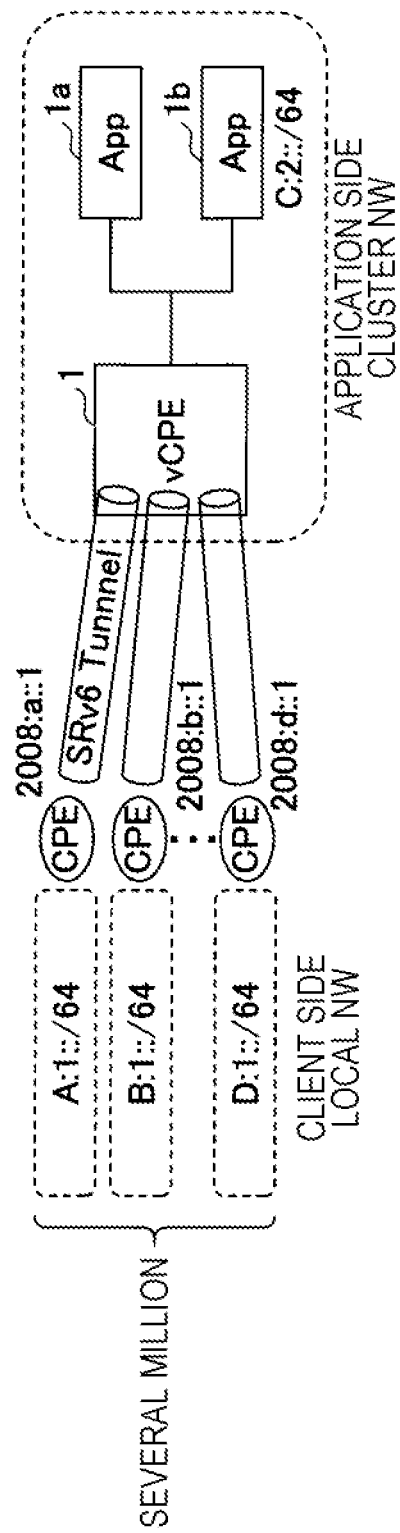
FIG. 2 illustrates an assumption of a use case.

A configuration example of clients, applications, and a vCPE in a MaaS service is illustrated in FIG. 2. The vCPE 1 in FIG. 2 has tunnel settings (SRv6 settings for encapsulation) for transmitting a packet to the clients.

Hereinafter, an example of the SRv6 settings in the vCPE 1 in FIG. 2 (Linux (registered trademark) Kernel implementation) will be described. The vCPE 1 requires the SRv6 setting for each client, and, for scalability, each setting has the TTL, and a setting that is not used for a certain period of time is deleted.

<SRv6 Setting for Decapsulation>
(1) C:2::/64 encap seg6 seg6local action END.DX6
    <SRv6 setting for encapsulation>
(2) A:1::/64 encap seg6 segs encap [2008:a::1]2008:a::1 via (ipv6 gw outside cloud)
(3) B:1::/64 encap seg6 segs encap [2008:b::1]2008:b::1 via (ipv6 gw outside cloud)
(4) D:1::/64 encap seg6 segs encap [2008:c::1]2008:d::1 via (ipv6 gw outside cloud)

Problem

The tunneling settings (FIB settings in a case of SRv6) corresponding to the number of clients is required for a tunneling termination device (vCPE) on the cloud. When the number of settings becomes enormous, it takes time to insert FIB lookup or a new entry, and thus throughput decreases. In a tunneling protocol other than SRv6, the number of settings has an upper limit.

More specifically, as disclosed in Non Patent Literature 1, in a case where there are several tens to five hundred thousand of route entries, it takes time to perform IPv6 lookup, which exceeds an allowable value (50 ns) of 10 Gbps. It also takes time to insert a route, which delays communication to a new client.

In addition to the above, as disclosed in Non Patent Literature 2, the throughput tends to be lower in SRv6 than that in IPv6 due to influences of recurring lookup and implementation. As a related art, an algorithm for incrementally updating the FIB, which is capable of handling a routing change, has been proposed for a routing scalability problem (On the Aggregatability of Router Forwarding Tables, 2010).

In FIB entries for tunneling, the entries cannot be aggregated unless both a prefix of an inner IP address (EID of the E2E overlay technology) and a prefix of an outer IP address (RLOC of the E2E overlay technology) can be aggregated. Therefore, application of the above related art to the problem is not realistic.

Overview of Present Embodiment

Hereinafter, an overview of a technology according to the present embodiment for solving the above problem will be described.

Approach to Problem

First, an approach to the problem will be described. In the present embodiment, when the number of tunneling settings (the number of FIB entries in a case of SRv6) increases, vCPEs are subjected to autoscaling. The settings are distributed between the plurality of vCPEs to perform control such that the number of FIB entries is equal to or less than an upper limit (a numerical value in a normal range that is not a bottleneck).

Figure 3:
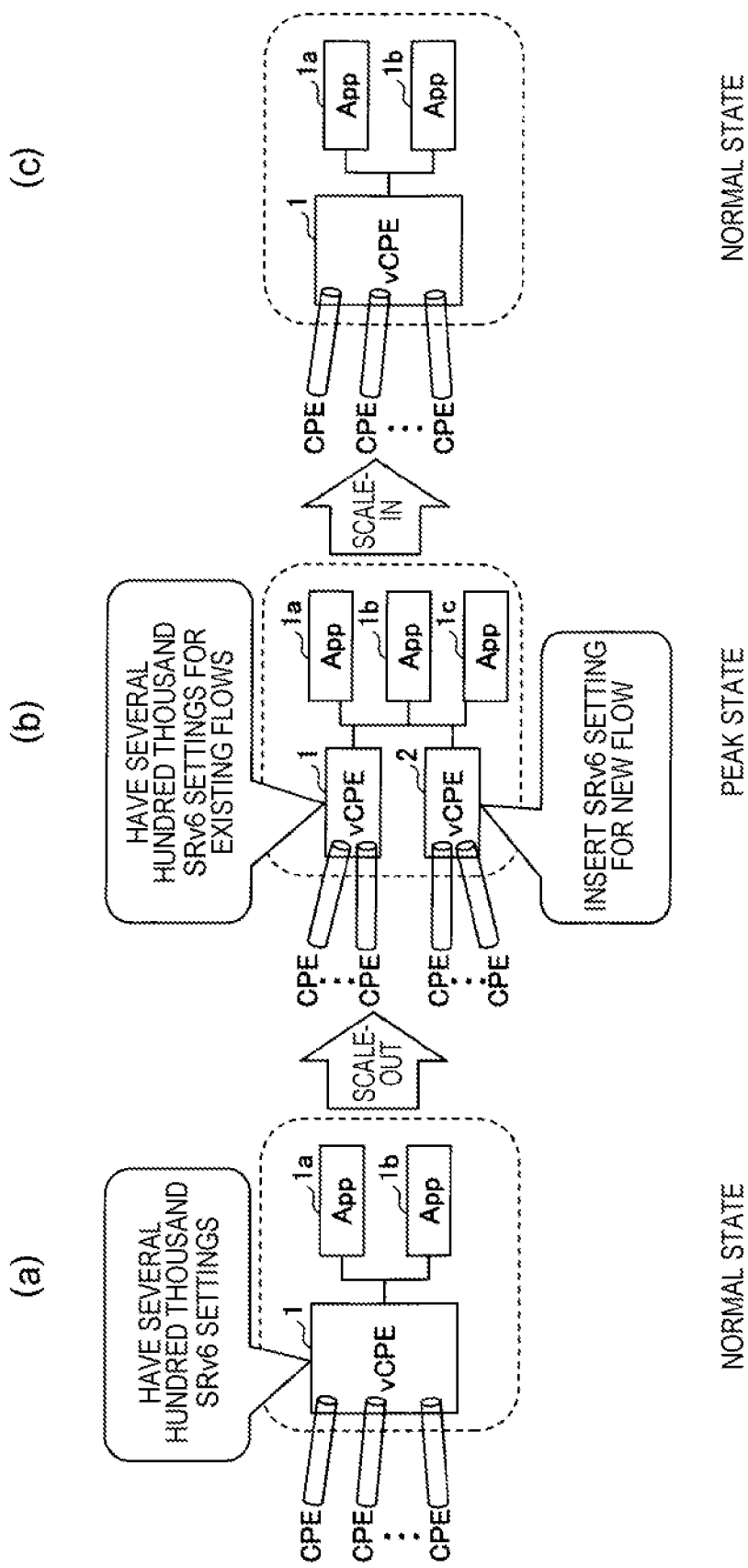
FIG. 3 illustrates an approach to a problem.

The above approach will be described with reference to FIG. 3. In a normal state illustrated in (a) of FIG. 3, when the number of FIB entries of the vCPE 1 exceeds a threshold (e.g. 300,000 routes), the number of vCPEs is increased (scale-out).

After the scale-out, as illustrated in (b), existing flows (traffic of existing clients) are drawn into the vCPE 1, and the SRv6 settings of the vCPE 1 are used. An SRv6 setting for a new flow (traffic of a new client) is inserted into the vCPE 2.

Thereafter, when the number of FIB entries decreases, as illustrated in (c), the SRv6 settings are changed such that the vCPE 1 can process the communication to the vCPE 2, and routes thereof are switched.

By the processing described above, autoscaling is performed when the number of tunneling settings increases, and the settings are distributed between the plurality of vCPEs. This makes it possible to avoid a decrease in throughput even when the number of clients increases.

<Requirements for Autoscaling>

Figure 4:
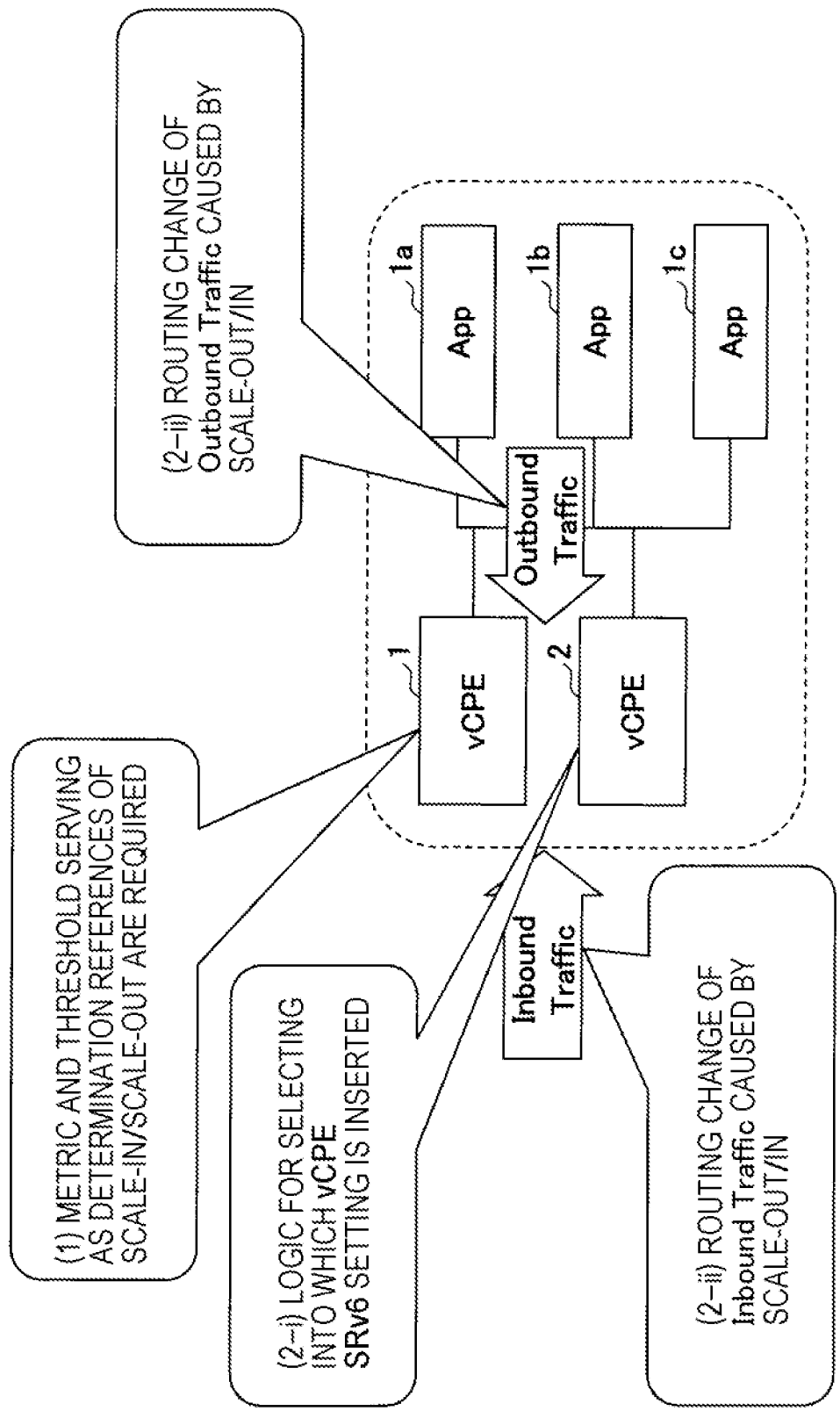
FIG. 4 illustrates requirements for an autoscaling method.

Next, requirements for an autoscaling method will be described with reference to FIG. 4. As shown in (1) (Requirement (1)) of FIG. 4, a metric and threshold serving as determination references of scale-in/scale-out are required. For the metric and threshold, a predicted-value-based metric (index) is used to efficiently perform scale-out/scale-in.

Regarding insertion of a SRv6 setting and switching of a route after scale-out/scale-in, as shown in (2)-i (Requirement (2)-i), first, a logic for selecting into which vCPE the SRv6 setting is inserted is required.

For the above point, a vCPE into which the setting is inserted is selected such that the number of FIB entries is equal to or less than the upper limit. Here, the existing flows are drawn into a vCPE already having the SRv6 settings, and a new flow is not drawn into a vCPE having a large number of FIB entries.

The above upper limit is a maximum value of the number of entries allowed by each vCPE. The threshold is a value that triggers scale-out/scale-in and is set as a ratio to the upper limit, for example.

For a routing change of outbound/inbound traffic caused by scale-out/scale-in shown in (2)-ii (Requirement (2)-ii), appropriate route switching for inserting the setting into the selected vCPE is required.

An overview of the technology according to the present embodiment considering the above requirements will be described below.

<Requirement (1)>

In the present embodiment, the number of FIB entries is used as the metric. The number of future clients that affect the metrics of both scale-out and scale-in is predicted on the basis of information regarding the number of FIB entries and the TTL and a tendency of connection of new clients.

<Requirement (2)-i>

At the time of scale-out, a vCPE having the smallest number of FIB entries is selected, and a new SRv6 setting is inserted into the vCPE. In the configuration example in FIG. 4, the vCPE 1 has the number of FIB entries equal to or close to the threshold and thus processes the existing flows in order to prevent overlap of entries, but does not accept a new flow. The vCPE 2 has a small number of FIB entries, and thus an SRv6 setting for the new flow is inserted into the vCPE 2.

After the number of FIB entries is balanced in each vCPE (after a difference therebetween falls within a certain threshold), an SRv6 setting is continuously inserted into the vCPE 2, or a vCPE into which a new SRv6 setting is inserted is selected in consideration of surplus of traffic and the number of FIB entries.

Regarding performing scale-in (performing scale-in after it is determined to perform scale-in by using the metric), for example, scale-in is performed when both traffic and the number of FIB entries are equal to or less than thresholds. Here, the vCPE having the smallest number of FIB entries is selected as a scale-in target, and the SRv6 settings are migrated to remaining vCPEs.

<Requirement (2)-ii>

In scale-out, at the time of an inquiry from the CPE 4 to the DB 5, the DB 5 instructs the CPE 4 to connect to the selected vCPE. The application returns communication to the source vCPE. In scale-in, information of a vCPE to be deleted is deleted from the DB 5. After it is confirmed that traffic has stopped coming, scale-in (deletion of the vCPE) is performed. Hereinafter, a configuration and operation of the present embodiment will be described in more detail.

(System Configuration)

Figure 5:
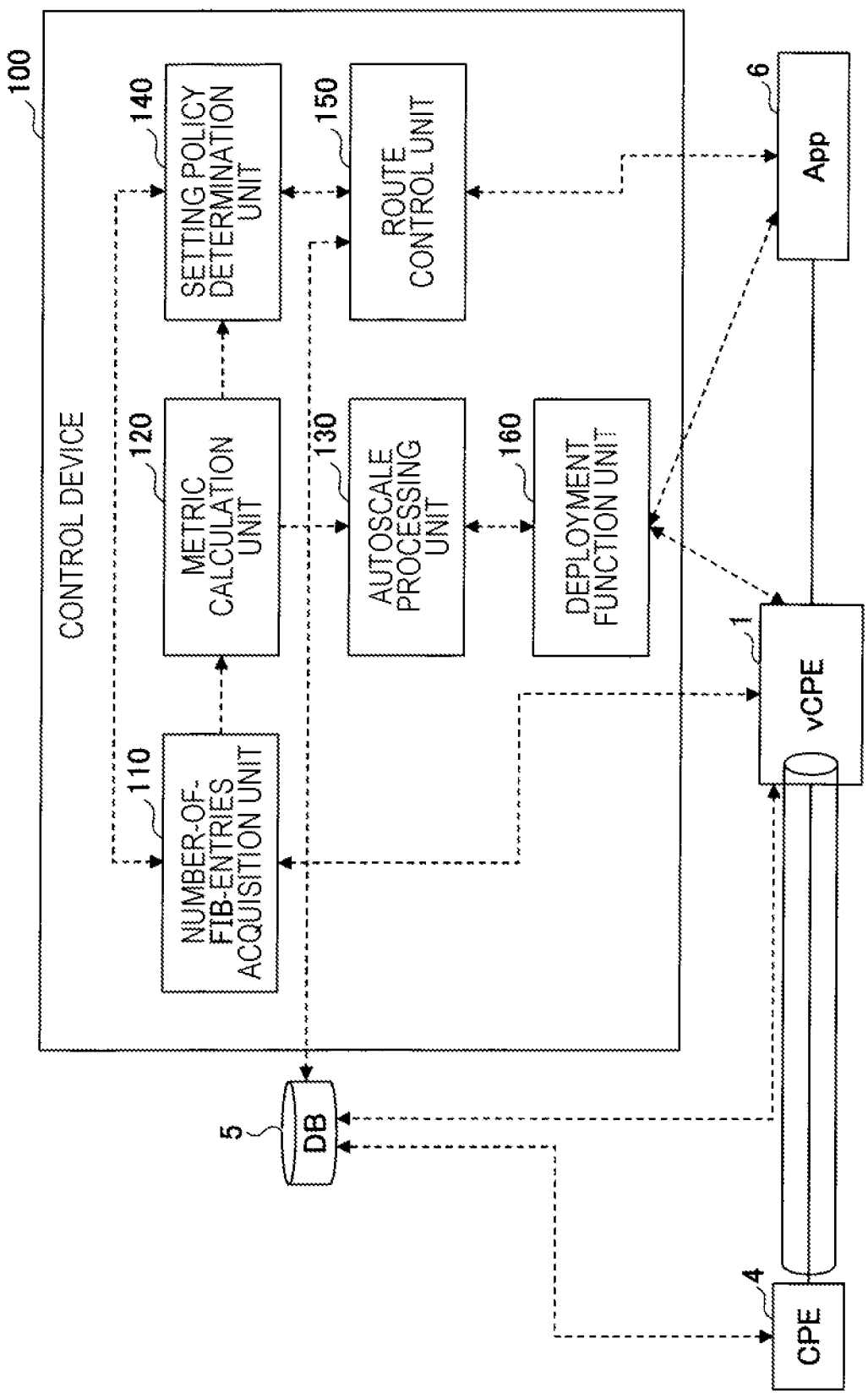
FIG. 5 is a configuration diagram of a system in the present embodiment.

FIG. 5 illustrates a configuration example of a communication control system in the present embodiment. As illustrated in FIG. 5, the communication control system includes the CPE 4, the vCPE 1, the DB 5, an application 6, and a control device 100. As illustrated in FIG. 5, the devices are connected via a network so as to exchange information. Although FIG. 5 illustrates one CPE, one vCPE, and one application, a plurality of CPEs, vCPEs, and applications may exist.

The CPE 4 is a NW device that accommodates a client terminal. The vCPE 1 is a NW device on the cloud that accommodates the application 6. The CPE 4 is a starting point of a tunnel, and the vCPE 1 is an terminal point of the tunnel. The DB 5 holds information regarding the CPE/vCPE and responds to an inquiry from the CPE/vCPE with information regarding a connection destination.

The control device 100 includes a number-of-FIB-entries acquisition unit 110, a metric calculation unit 120, an autoscale processing unit 130, a deployment function unit 160, a setting policy determination unit 140, and a route control unit 150. The control device 100 may include one computer (server) or a plurality of computers. The computers may be physical machines or virtual machines on the cloud.

The "number-of-FIB-entries acquisition unit 110+metric calculation unit 120" may be referred to as a calculation unit. The "autoscale processing unit 130+deployment function unit 160" may be referred to as an autoscale execution unit. The "setting policy determination unit 140+route control unit 150" may be referred to as a control unit. An operation overview of each unit is as follows.

The number-of-FIB-entries acquisition unit 110 acquires the number of FIB entries that is currently set in the vCPE 1. The metric calculation unit 120 calculates a metric on the basis of the number of current FIB entries, the TTL, and a predicted value of the number of new connections.

The autoscale processing unit 130 determines processing content of autoscale (the number of vCPEs to be increased, the number of vCPEs to be decreased, and the vCPE to be deleted) on the basis of a determination result of the metric acquired from the metric calculation unit 120 and the threshold. The deployment function unit 160 deploys a vCPE, a virtual IP address (VIP), or a pod for the application in response to an instruction from the autoscale processing unit 130. The "VIP" here is a service resource to which a virtual IP address that can be used in the cluster is allocated and is a functional unit that performs transfer processing of communication in the cluster, for example.

The setting policy determination unit 140 determines a tunnel setting policy (a vCPE into which a new client setting is inserted at the time of scale-out and a vCPE to which existing client settings are migrated at the time of scale-in) on the basis of the metric value.

The route control unit 150 issues an instruction on a route setting to the deployed pod or an instruction on a control policy of the DB 5 in accordance with the determination of the setting policy.

Details of the operation of each unit described above will be described later.

(Operation Overview)

Figure 6:
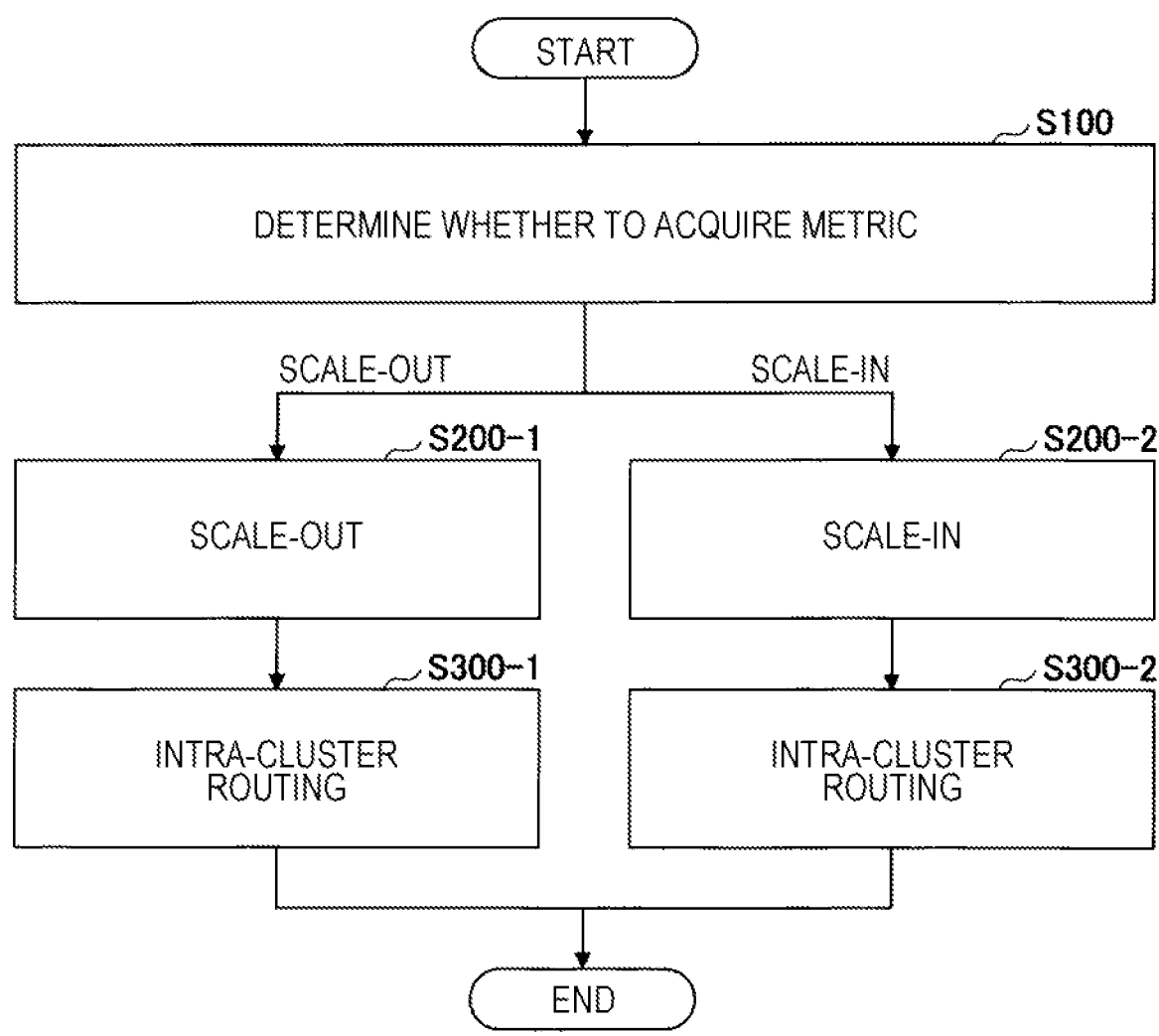
FIG. 6 is a flowchart showing a processing procedure of a control device 100.

An overview of processing performed by the control device 100 will be described with reference to FIG. 6. In S100, the control device 100 acquires a metric for the vCPE and determines whether to execute scale-out/scale-in.

When determining to perform scale-out, the control device executes scale-out processing in S200-1 and performs intra-cluster routing control related to the scale-out in S300-1. When determining to perform scale-in, the control device executes scale-in processing in S200-2 and performs intra-cluster routing control related to the scale-in in S300-2.

Hereinafter, the processing in S100, S200, and S300 will be described in more detail.

(S100: Acquisition of Metric and Determination on Scale-Out/Scale-In)

The number of FIB entries of the vCPE depends on the number of clients. The number of clients that abandon in the future can be predicted on the basis of the TTL of the setting, and the number of new client connections can also be calculated by time-series analysis. Thus, in the present embodiment, a predicted value of the number of FIB entries is used as the metric. Using the predicted value instead of an actual measurement value has the following effects.

- It is possible to reduce the frequency of acquisition of the actual measurement value and also to reduce a processing load of the pod.
- It is possible to effectively use resources because the scale-in processing can be performed earlier in particular, as compared with a case of using the actual measurement value.

Procedures executed by the control device 100 in S100 will be described in more detail. The control device 100 executes Procedure 1 to Procedure 4 below.

<S100: Procedure 1>

The control device 100 performs time-series prediction by using past number-of-clients statistical information and calculates a predicted value of the number of new client connections. A method of the time-series prediction is not limited to a specific method, but, for example, an ARIMA model can be used. This is because the number of clients can be regarded as a unit root process if leveling can be performed with a time width that is large to some extent, i.e., one hour. The number of new client connections may be predicted by using demand information regarding related services such as car navigation.

<S100: Procedure 2>

The control device 100 acquires the number of FIB entries of the vCPE and the TTL of each of the number of FIB entries from a custom metric on the cloud or from the execution result of a metric-server or shell at certain time intervals.

<S100: Procedure 3>

The control device 100 calculates a predicted value of the number of future FIB entries of the vCPE on the basis of information regarding Procedures 1 and 2. As the predicted value, a predicted value for each vCPE may be calculated, or an average value of the predicted values for the vCPEs may be calculated. In the present embodiment, the average value is used in S100.

<S100: Procedure 4>

The control device 100 compares the value calculated in Procedure 3 with a scale-out threshold (e.g. 300,000 routes) and determines to perform scale-out when the predicted value of the number of FIB entries exceeds the scale-out threshold. When the predicted value of the number of FIB entries falls below a scale-in threshold (e.g. 100,000 routes or the average value of the FIB entries of vCPEs after scale-in), the control device determines to perform scale-in.

(S200-1: Selection Logic of vCPE at the Time of Scale-Out)

Next, a selection logic of a vCPE at the time of scale-out will be described.

In order to avoid adding an SRv6 setting to a vCPE already having a large number of FIB entries, the control device 100 selects a vCPE having the smallest number of FIB entries from the plurality of vCPEs and sets the vCPE as a destination into which the SRv6 setting (tunnel setting) for a new client is inserted. Procedures 1 to 3 for selecting the vCPE into which the setting for the new client is inserted are as follows.

<S200-1: Procedure 1>

A new vCPE is enabled by registering the new vCPE in the DB 5.

<S200-1: Procedure 2>

After the above scale-out is performed, the control device 100 selects a vCPE (=newly deployed vCPE) having the smallest number of current FIB entries and sets the vCPE as a destination into which the SRv6 setting for the new client is inserted.

<S200-1: Procedure 3>

After the number of FIB entries of each vCPE is balanced, the control device 100 acquires the number of FIB entries (metric value) of each vCPE and switches the destination into which the SRv6 setting for the new client is inserted according to one of the following policies.

(Policy 1) A vCPE having the largest difference between the threshold and the metric value is selected as the destination of insertion.

(Policy 2) The destination of insertion is selected by round robin from the vCPEs.

Figure 7:
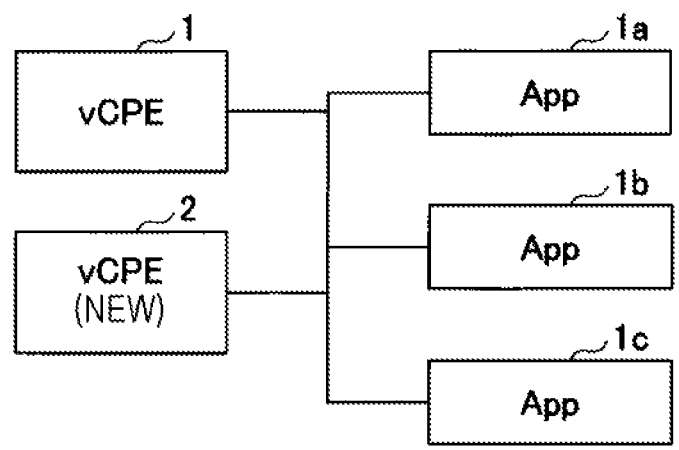
FIG. 7 illustrates an example of scale-out.

Hereinabove, Procedures 1 to 3 have been described. A situation at the time of scale-out will be described with reference to FIGS. 7 and 8. FIG. 7 shows that the vCPE 2 has been added as a new vCPE. At this time, the vCPE 1 has the number of FIB entries equal to or larger than the threshold, and thus, in order to avoid adding a setting, the vCPE 2 is selected as the destination into which the SRv6 setting for the new client is inserted.

Figure 8:
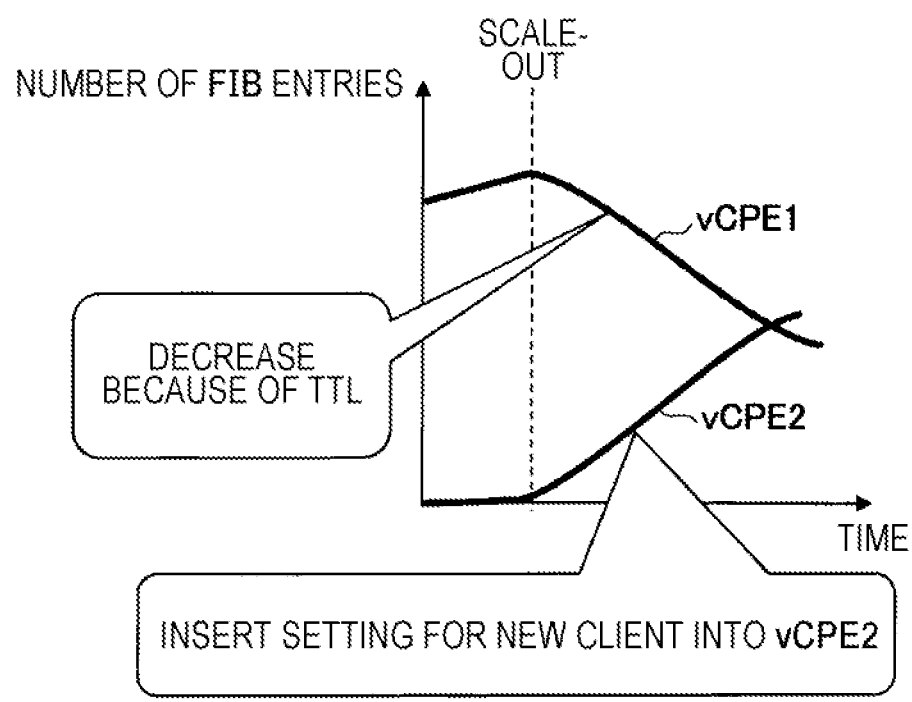
FIG. 8 illustrates an example of scale-out.

As illustrated in FIG. 8, after the scale-out, the number of FIB entries of the vCPE 1 decreases, whereas the number of FIB clients of the vCPE 2 increases. After the numbers of FIB entries of the vCPE 1 and the vCPE 2 are balanced, a vCPE serving as the destination into which the SRv6 setting for the new client is inserted is reselected according to Policy 1 or Policy 2.

(S200-2: Selection Logic of vCPE at the Time of Scale-In)

Next, a selection logic of a vCPE at the time of scale-in will be described.

The control device 100 selects a vCPE having the smallest number of FIB entries as a scale-in target and performs migration in order from a vCPE having the largest number of FIB entries. Settings are packed into a vCPE having a small number of FIB entries up to the same number as the threshold, thereby effectively using resources. Procedures 1 and 2 for migrating the existing settings at the time of scale-in are as follows. Description will be made with reference to FIG. 9.

<S200-2: Procedure 1 (Selection of Scale-In Target)>

Figure 9:
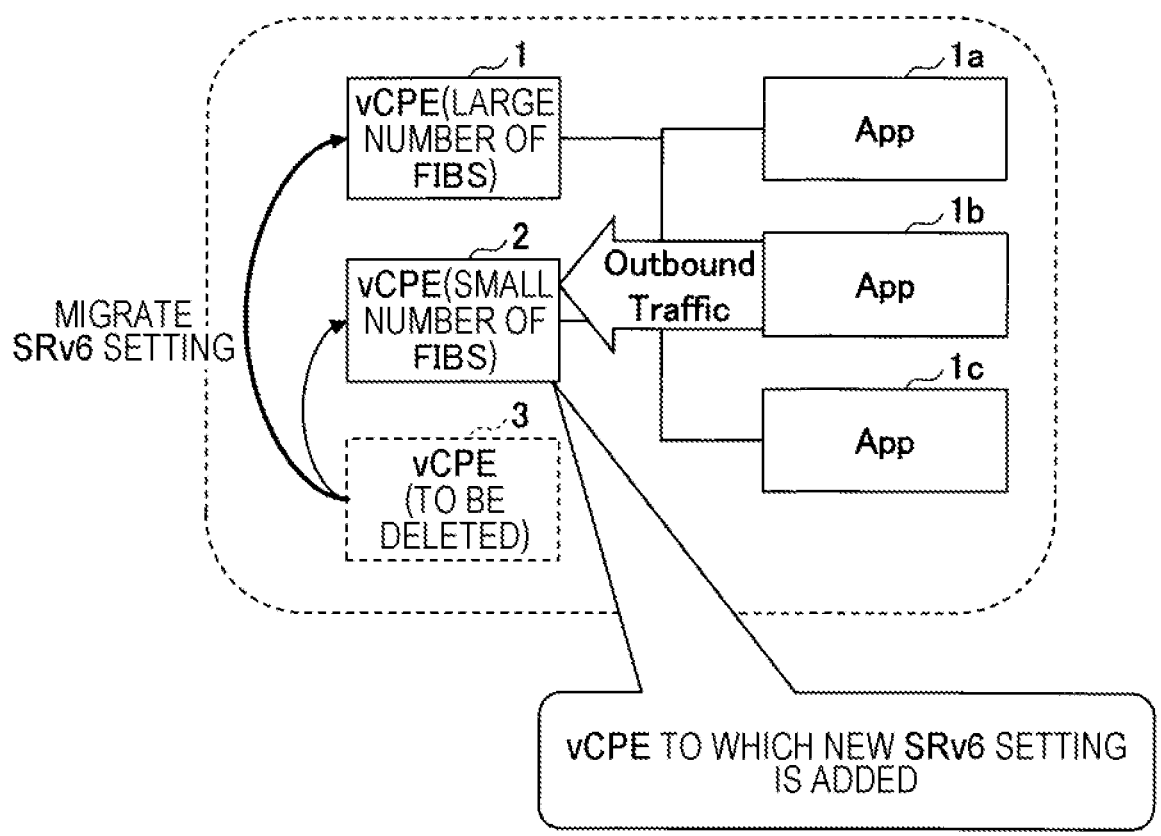

The control device 100 acquires the number of FIB entries of each vCPE and selects the vCPE having the smallest number of FIB entries (a vCPE 3 in the example of FIG. 9) except for the vCPE to which a new SRv6 setting is added (the vCPE 2 in the example of FIG. 9). The vCPE 2 having a small number of FIB entries is left to accept the new SRv6 setting.

<S200-2: Procedure 2 (Selection of Migration Destination)>

The control device 100 migrates SRv6 settings already set in the scale-in target in descending order of the number of FIB entries (order from the vCPE 1 to the vCPE 2 in FIG. 9).

(Background and Problems of Intra-Cluster Routing Control)

Figure 10:
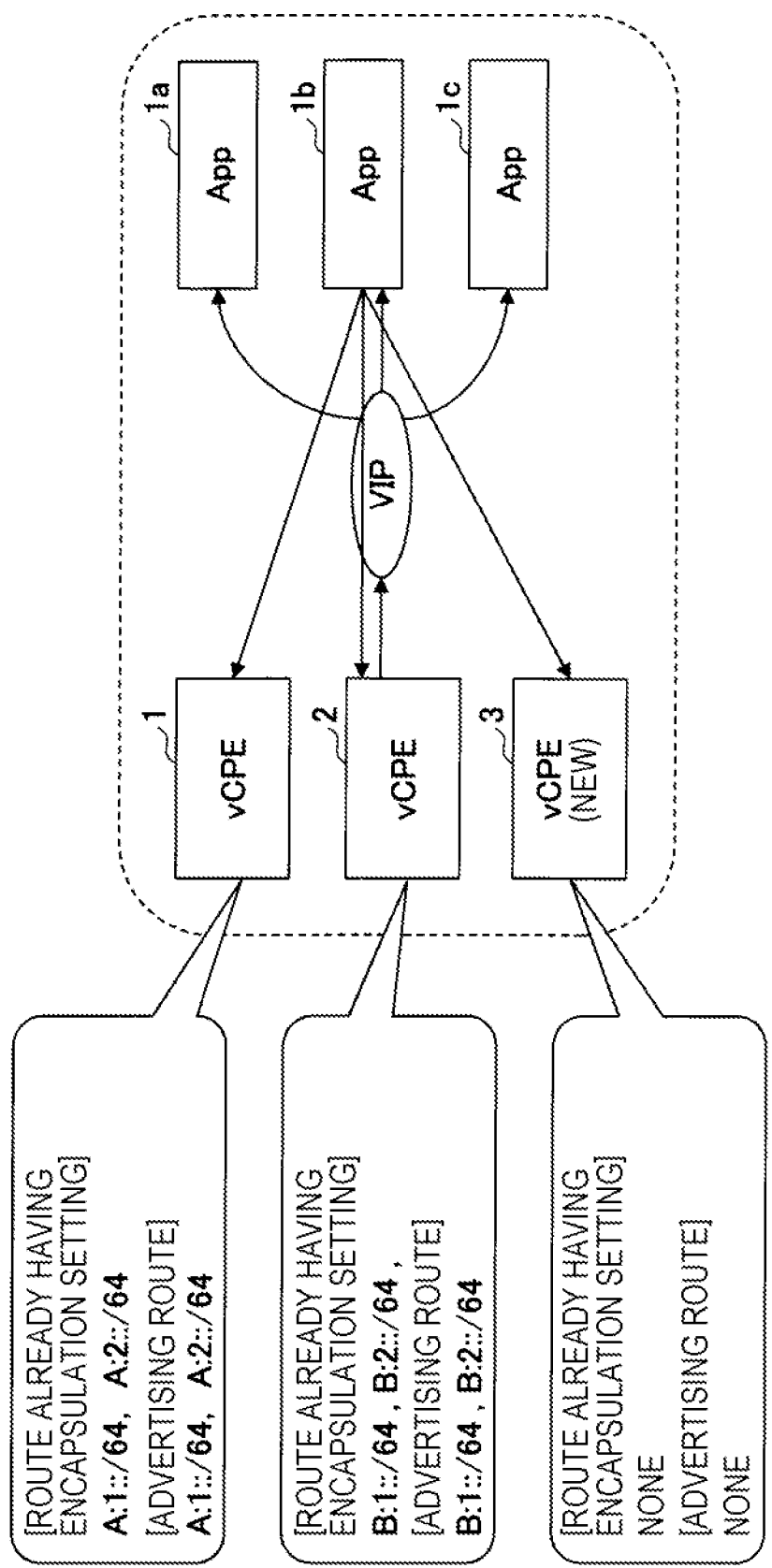
FIG. 10 illustrates background and problems of intra-cluster routing control.

Next, intra-cluster routing control will be described. First, background and problems of the intra-cluster routing control will be described. FIG. 10 will be appropriately referred to.

Background and Requirements

Insertion of an SRv6 setting and routing of the outbound traffic (traffic for clients) are linked. In order to prevent overlap of the SRv6 setting between the vCPEs, it is necessary to draw existing outbound traffic into a vCPE already having the encapsulation setting. It is also necessary to draw new outbound traffic into the vCPE having a small number of FIB entries.

Problems

It is desirable to execute route control satisfying the above requirements in a scalable manner. However, in a case where the vCPE is identified by a nexthop of a border gateway protocol (BGP), routes to EIDs of several million order (A:1::/64 or B:1::/64 in FIG. 10) are advertised and thus are not scaled. Similarly, a size of a network address translation (NAT) table of a source NAT (SNAT) exceeds an upper limit. In a case where the BGP is used, a routing table of a host needs to have routes to EIDs corresponding to the number of clients, and it is desirable to reduce the routes to several thousand orders.

The intra-cluster routing control that solves the above problems will be described below.

(S300: Overview of Intra-Cluster Routing)

First, an overview of the intra-cluster routing will be described.

In the present embodiment, the number of routes in the cluster is reduced by fixing vCPEs used for each application.

Figure 11:
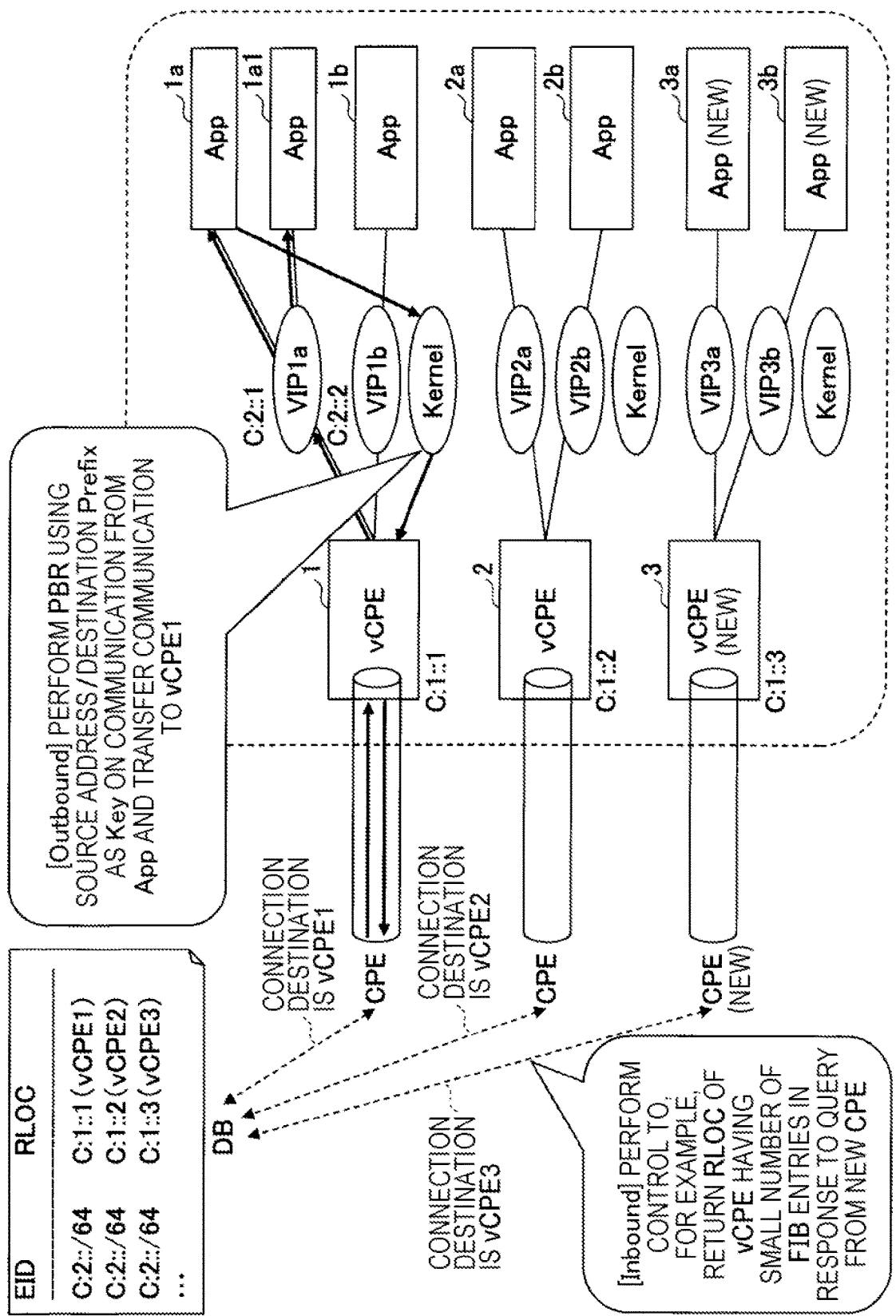
FIG. 11 illustrates an overview of intra-cluster routing.

For example, as illustrated in FIG. 11, there are two types of applications a and b, pods associated with the vCPE 1 are set as an app 1a and app 1b. Communication to opposing EIDs of the app 1a and app 1b always passes through the vCPE 1, and an unnecessary route is deleted.

In an inbound direction, the DB 5 responds to a connection request from the CPE with an RLOC of the vCPE on the basis of the logic determined in S200. As illustrated in FIG. 11, for example, the DB 5 performs control to return an RLOC of the vCPE having a small number of FIB entries in response to a query from a new CPE to which a new client is to be connected. The vCPE serving as a connection destination transfers a packet to a subordinate VIP, and the VIP transfers the packet to the associated app pod.

In an outbound direction, communication from the app is transferred to the vCPE by any one of the following means. Thereafter, the communication is transferred from the vCPE to the CPE through the tunnel.

Policy based routing (PBR) is performed by a host kernel to transfer communication to the corresponding vCPE. Specifically, as illustrated in FIG. 11, the PBR using a source address/destination prefix as a key is performed on the communication from the app, and the communication is transferred to the vCPE.

In a routing table of the app pod, routes to EIDs are set in the vCPE.

A reverse proxy container is prepared for each app pod and is transferred to the corresponding vCPE by tunneling.

Each of the above methods has the same meaning as setting routing for each app pod (application) and thus can improve scalability, as compared with the method described with reference to FIG. 10.

(S300-1: Intra-Cluster Routing at the Time of Scale-Out)

Procedures 1 and 2 of the C-Plane in the intra-cluster routing at the time of scale-out are as follows.

<S300-1: Procedure 1 (Input of Route Setting)>

The control device 100 performs a routing setting between the newly deployed vCPE and the app pod. As a method of the routing setting, for example, either Method 1 or Method 2 can be used.

Method 1: A static route of a vCPE corresponding to an EID space is input to the app pod.

Method 2: A PBR setting for transferring communication of "source: app pod, destination: EID space" to the corresponding vCPE is input to a host in which the app pod is deployed. Those methods have the same meaning as setting routing for each app pod, but required policies are only for the number of pods activated on the host at the most and thus are much smaller than a case of having a BGP route for each CPE. This makes it possible to improve scalability.

Figure 12:
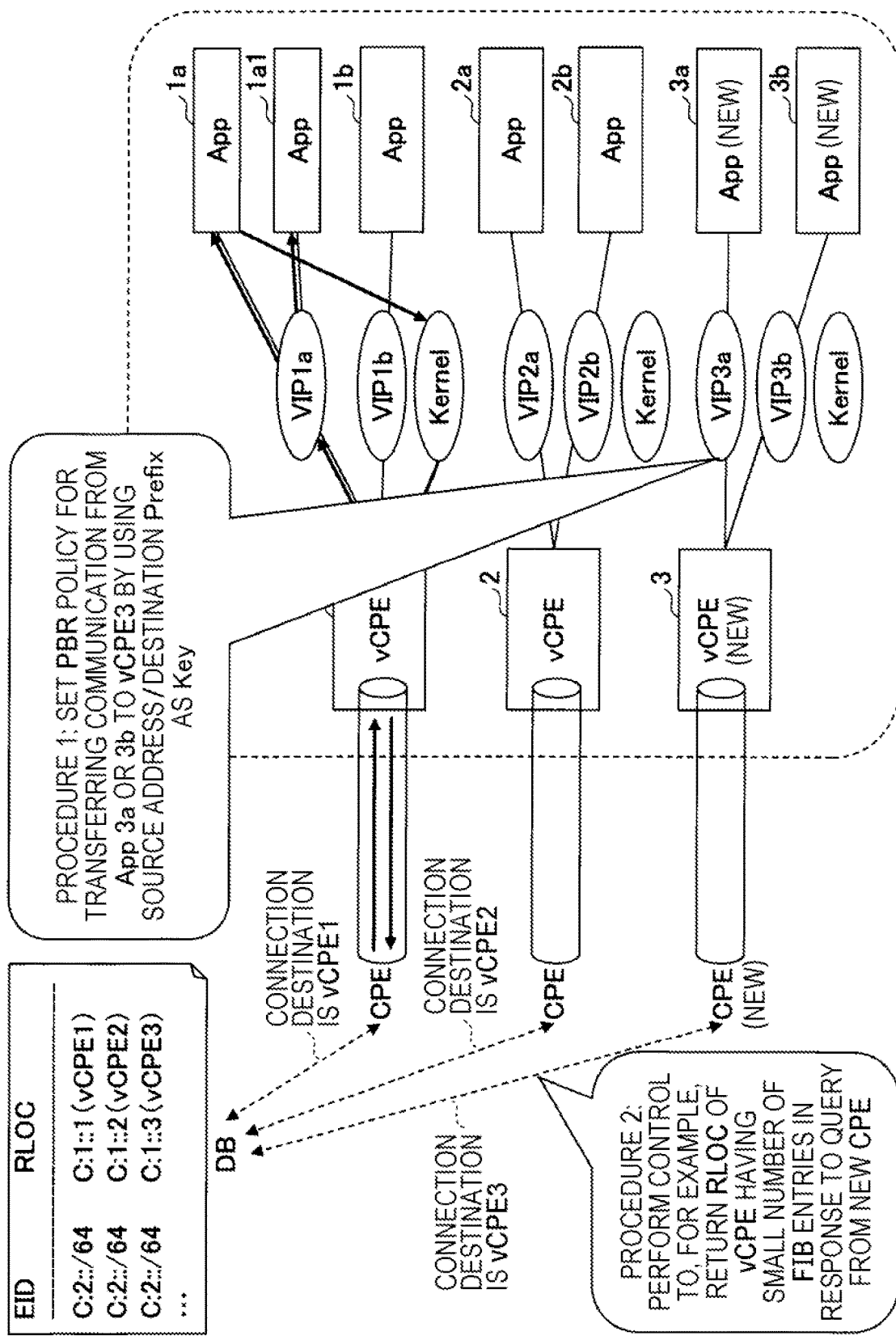
FIG. 12 illustrates intra-cluster routing at the time of scale-out.

In Procedure 1, for example, in the configuration of FIG. 12, a PBR policy for transferring communication from an app 3a or 3b to the vCPE 3 by using the source address/destination prefix as a key is set in the host.

<S300-1: Procedure 2 (DB Control)>

Based on the selection logic described in S200-1, RLOC information to be responded to the new CPE from the DB 5 is controlled. Specifically, in the example of FIG. 12, for example, control to return the RLOC of the vCPE having a small number of FIB entries in response to a query from the new CPE is performed. At this time, only the RLOC of the vCPE 3 may be responded, or the RLOC of each vCPE may be responded by round robin.

(S300-2: Intra-Cluster Routing at the Time of Scale-In)

Procedures 1 and 2 of the C-Plane in the intra-cluster routing at the time of scale-in are as follows. Those procedures are performed after Procedure 2 in S200-2 ends.

<S300-2: Procedure 1 (DB Control)>

Figure 13:
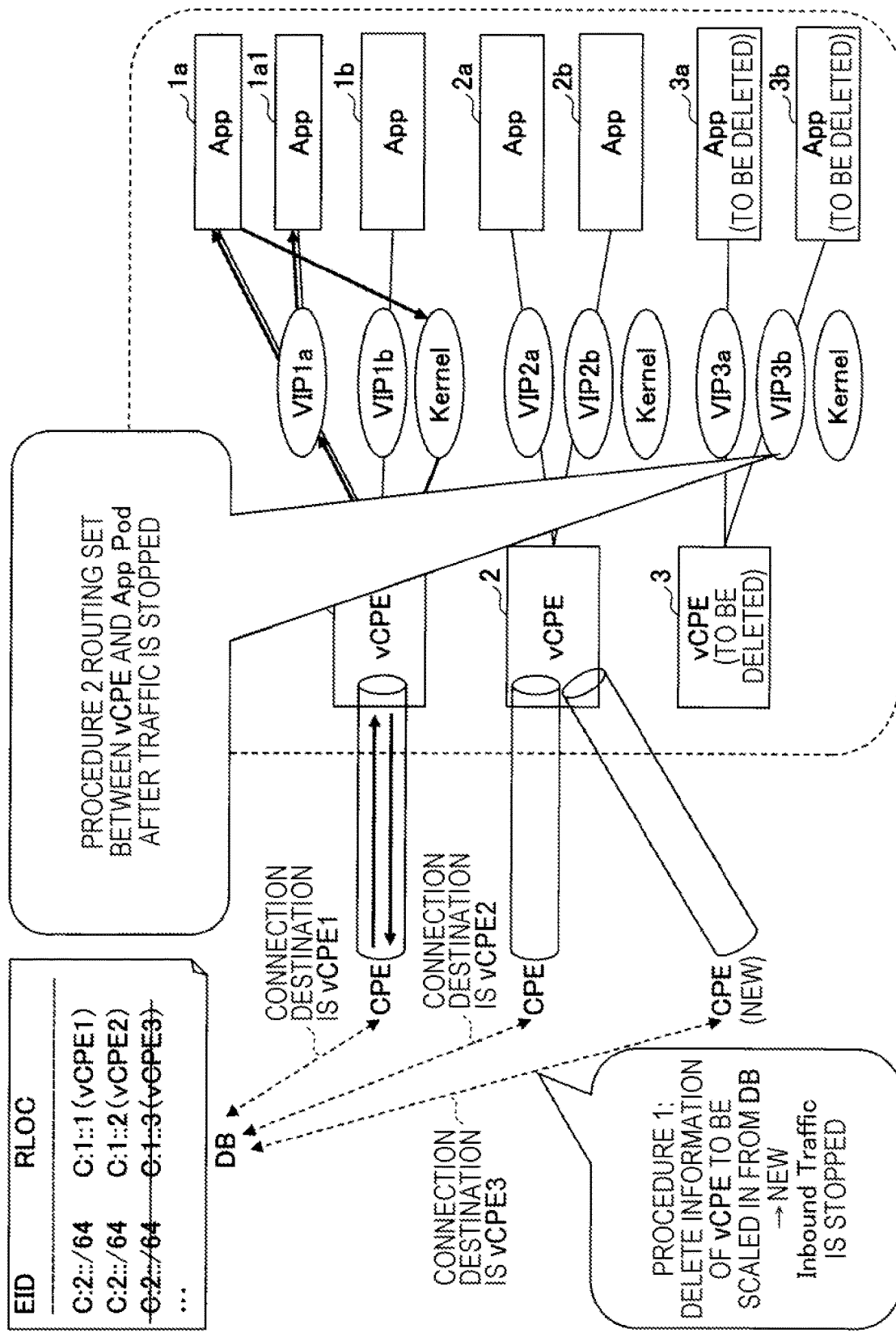

The control device 100 deletes information of the vCPE to be scaled in from the DB 5. In the example of FIG. 13, the information of the vCPE 3 is deleted. Therefore, new inbound traffic is stopped.

<S300-2: Procedure 2 (Deletion of Route Setting)>

After it is confirmed that an inflow of the inbound traffic becomes zero, the control device 100 deletes the routing setting between the vCPE to be scaled in and the app pod. In the example of FIG. 13, the routing setting between the vCPE 3 and the apps 3a and 3b is deleted.

(Description of Detailed Functions of Control Device)

Hereinafter, an operation of each functional unit included in the control device 100 that executes the above control will be described in more detail. The functional units included in the control device 100 are as illustrated in FIG. 5.

<Number-of-FIB-Entries Acquisition Unit 110>

Figure 14:
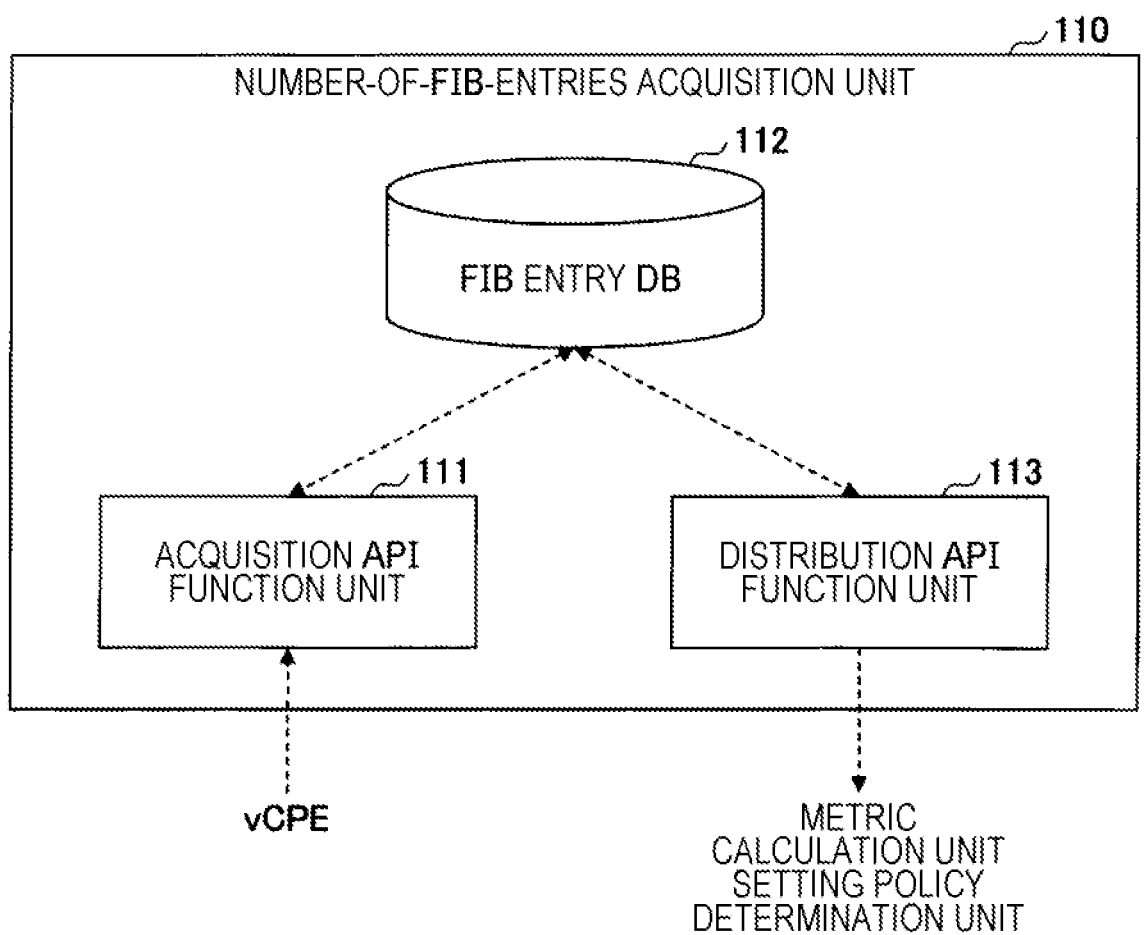
FIG. 14 is a configuration diagram of a number-of-FIB-entries acquisition unit.

FIG. 14 illustrates a configuration example of the number-of-FIB-entries acquisition unit 110. As illustrated in FIG. 14, the number-of-FIB-entries acquisition unit 110 includes an acquisition API function unit 111, an FB entry DB 112, and a distribution API function unit 113.

The acquisition API function unit 111 of the number-of-FIB-entries acquisition unit 110 accesses each vCPE every certain period of time and acquires the number of FIB entries set in the vCPE. Thereafter, the acquisition result is stored in the FIB entry DB 112 together with a timestamp. An example of data stored in the FIB entry DB 112 is illustrated in FIG. 15.

Information stored in the FIB entry DB 112 is transmitted to the metric calculation unit 120 and the setting policy determination unit 140 via the distribution API function unit 113.

<Metric Calculation Unit 120>

Figure 16:
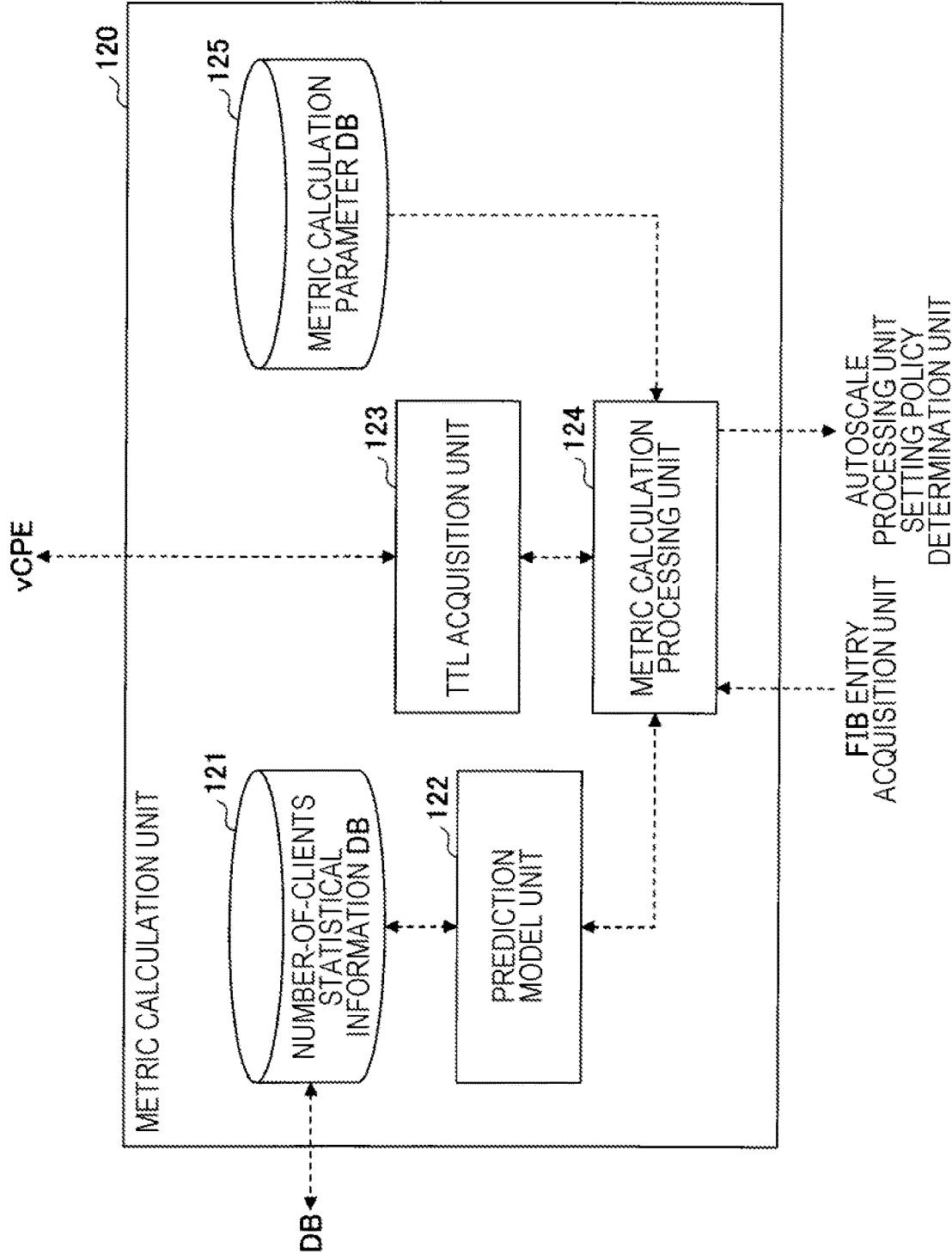
FIG. 16 is a configuration diagram of a metric calculation unit 120.

FIG. 16 illustrates a configuration example of the metric calculation unit 120. As illustrated in FIG. 16, the metric calculation unit 120 includes a number-of-clients statistical information DB 121, a prediction model unit 122, a TTL acquisition unit 123, a metric calculation processing unit 124, and a metric calculation parameter DB 125.

The metric calculation unit 120 calculates a metric (in the present embodiment, an average of the numbers of future FIB entries of the vCPEs) used for determination serving as a trigger for autoscale.

The TTL acquisition unit 123 periodically accesses each vCPE and acquires the TTL of each FIB entry. The number-of-clients statistical information DB 121 acquires a change in the number of connections from the DB 5 every certain period of time, calculates the number of new connections in each period of time/time series, and stores a value thereof. FIG. 17 illustrates an example of information stored in the number-of-clients statistical information DB 121.

The prediction model unit 122 generates a prediction model on the basis of the information stored in the number-of-clients statistical information DB 121 and calculates the number of future new connections.

The metric calculation parameter DB 125 holds parameter information and the like necessary for prediction. Specifically, the metric calculation parameter DB holds a time width for acquiring the number-of-clients statistical information serving as learning data, a ratio of entries deleted from the FIB within M minutes on the basis of the TTL, an algorithm used for generating the prediction model and a hyperparameter thereof, and the like. FIG. 18 illustrates an example of information stored in the metric calculation parameter DB 125.

The metric calculation processing unit 124 calculates the number of future FIB entries as the metric on the basis of the number of current FIB entries acquired from the number-of-FIB-entries acquisition unit 110, a predicted value of the number of new client connections calculated based on the prediction model, and a predicted value of the abandonment number of the existing clients acquired from the TTL acquisition unit 123. The calculated metric is transmitted to the autoscale processing unit 130 and the setting policy determination unit 140.

<Autoscale Processing Unit 130>

Figure 19:
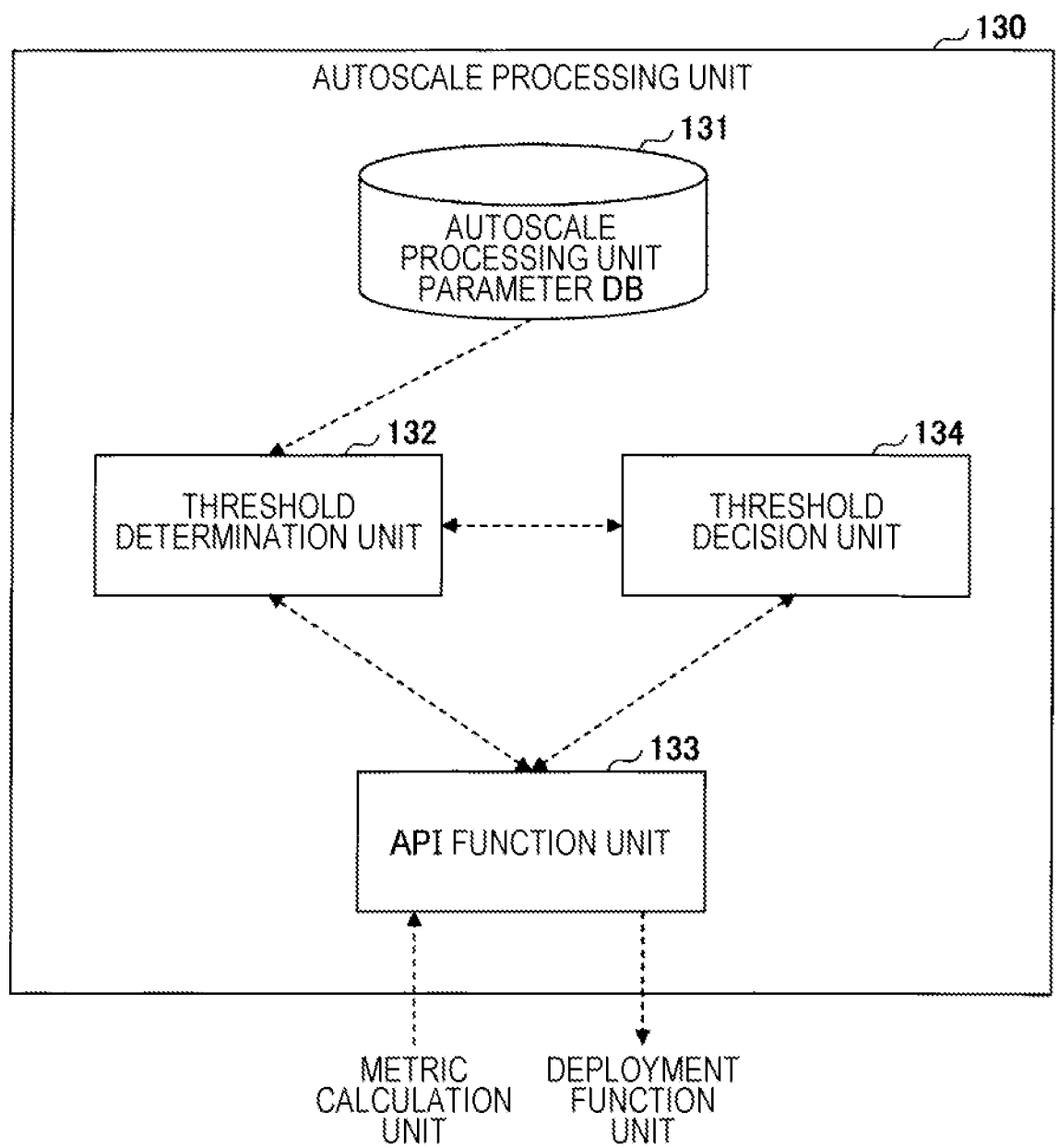
FIG. 19 is a configuration diagram of an autoscale processing unit 130.

FIG. 19 illustrates a configuration example of the autoscale processing unit 130. As illustrated in FIG. 19, the autoscale processing unit 130 includes an autoscale processing unit parameter DB 131, a threshold determination unit 132, an API function unit 133, and a threshold decision unit 134.

The autoscale processing unit 130 determines processing content of autoscale (the number of vCPEs to be increased, the number of vCPEs to be decreased, and the vCPE to be deleted) on the basis of a determination result of comparison between the metric acquired from the metric calculation unit 120 and the threshold.

The threshold determination unit 132 determines the threshold for performing scale-out/scale-in on the basis of information stored in the autoscale processing unit parameter DB 131. The autoscale processing unit parameter DB 131 holds information necessary for determining the threshold. Specifically, the autoscale processing unit parameter DB holds information such as the upper limit of the number of FIB entries of each vCPE and a ratio of the threshold to the upper limit. FIG. 20 illustrates an example of the information stored in the autoscale processing unit parameter DB 131.

The threshold decision unit 134 compares a value of the metric acquired from the metric calculation unit 130 with a value of the threshold acquired from the threshold determination unit 132 to determine whether to perform autoscaling and determines content of scale-out (the number of pods to be increased and the vCPE to be deleted at the time of autoscaling). The determination result is transmitted to the deployment function unit 160 via the API function unit 133, and the vCPE, VIP, app pod, and the like are deployed or deleted.

<Setting Policy Determination Unit 140>

Figure 21:
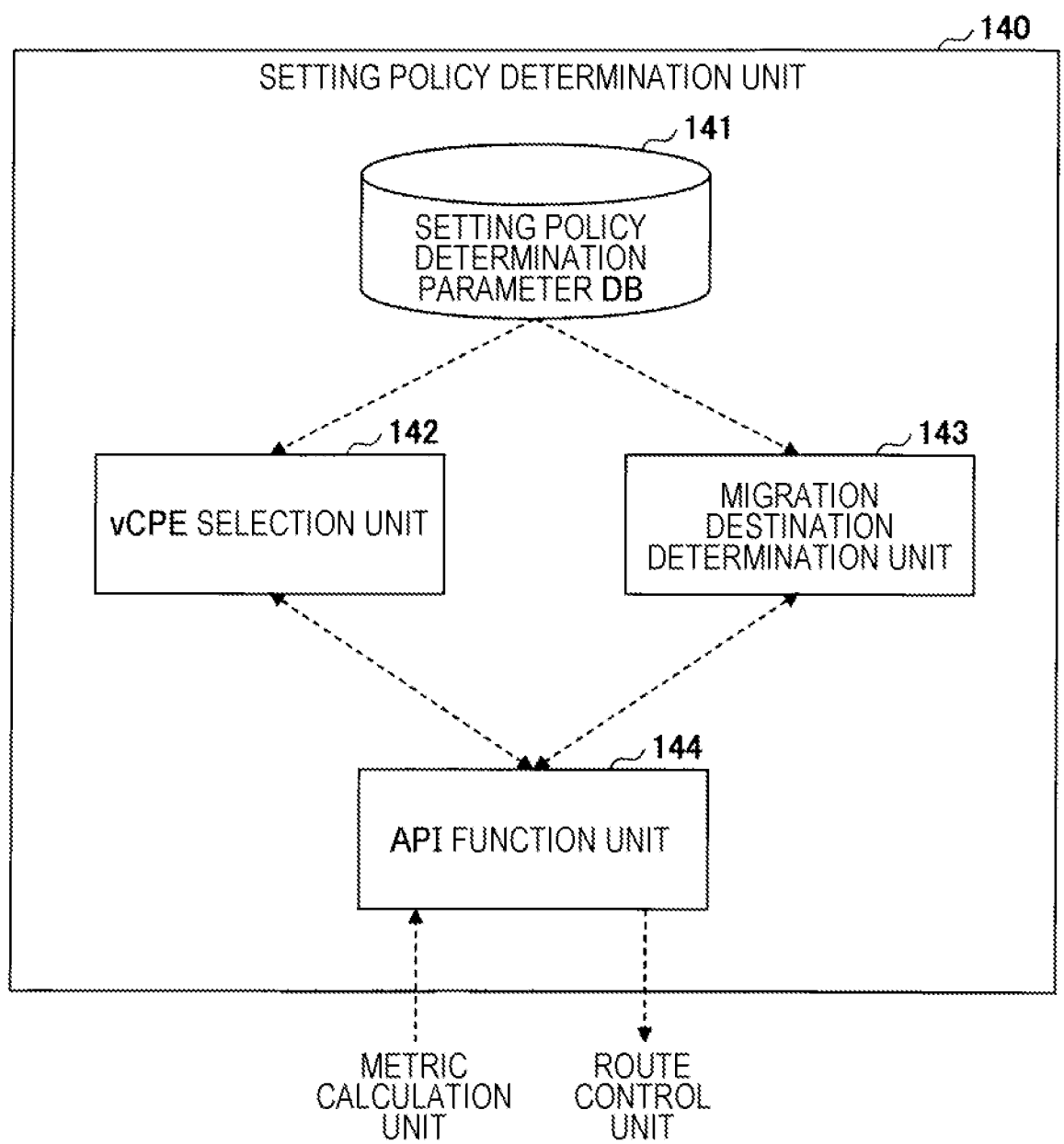
FIG. 21 is a configuration diagram of a setting policy determination unit 140.

FIG. 21 illustrates a configuration example of the setting policy determination unit 140. As illustrated in FIG. 21, the setting policy determination unit 140 includes a setting policy determination parameter DB 141, a vCPE selection unit 142, a migration destination determination unit 143, and an API function unit 144.

The setting policy determination unit 140 determines a tunnel setting policy (a vCPE into which a new client setting is inserted at the time of scale-out and a vCPE to which existing client settings are migrated at the time of scale-in) on the basis of the metric value.

The vCPE selection unit 142 selects the vCPE into which the setting for the new client is inserted after scale-out on the basis of the metric value acquired from the metric calculation unit 120 and the predicted value of the number of FIB entries of each vCPE. The selection result is transmitted to the route control unit 150 via the API function unit 144.

The migration destination determination unit 143 determines the vCPE to which the existing settings are migrated at the time of scale-in on the basis of the metric value acquired from the metric calculation unit 120 and the predicted value of the number of FIB entries of each vCPE. The determination result is transmitted to the route control unit 150 via the API function unit 144.

The setting policy determination unit parameter DB 141 stores parameters used by the vCPE selection unit 142 and the migration destination determination unit 143. Specifically, the setting policy determination unit parameter DB holds information such as a policy for selecting a vCPE after the FIB entries of the vCPEs are balanced and an upper limit value of each vCPE when the settings are migrated at the time of scale-in. FIG. 22 illustrates an example of the information stored in the setting policy determination unit parameter DB 141.

<Route Control Unit 150>

Figure 23:
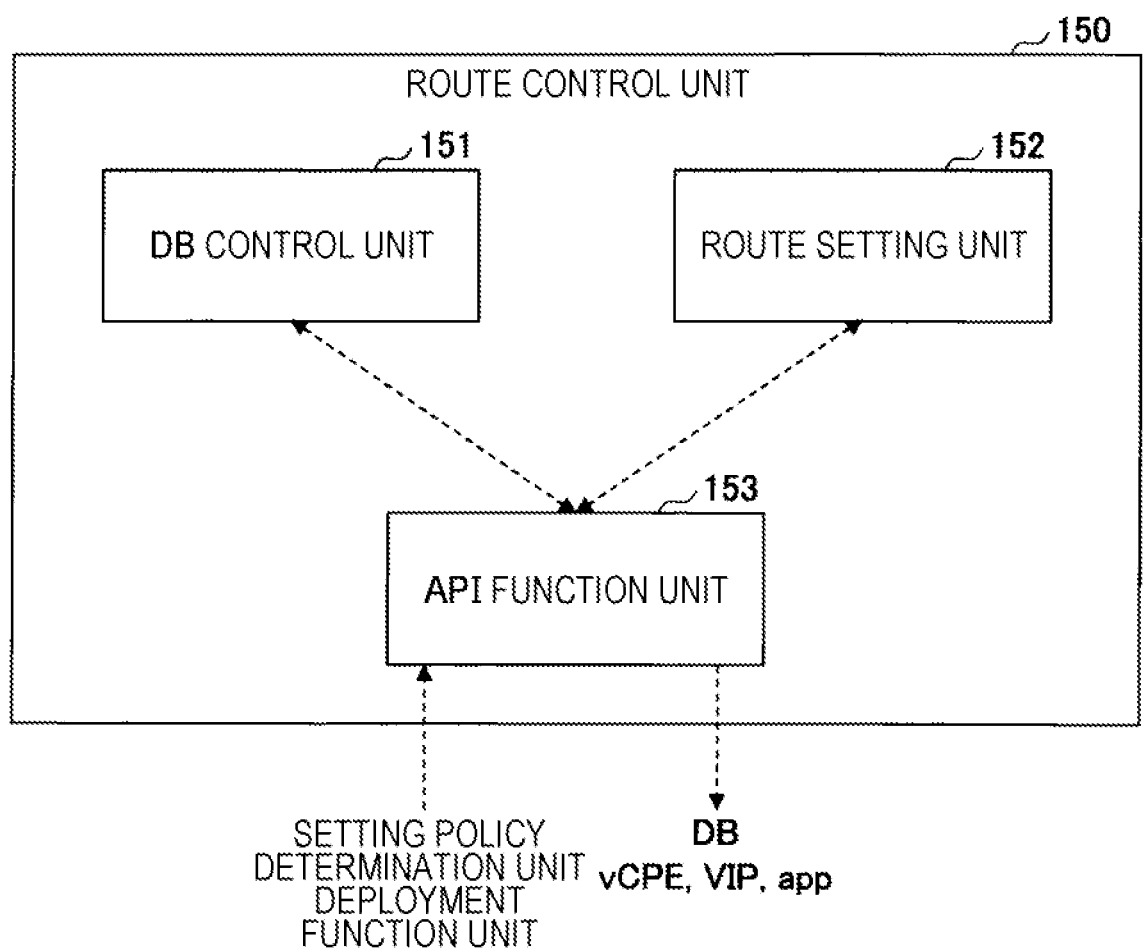
FIG. 23 is a configuration diagram of a route control unit 150.

FIG. 23 illustrates a configuration example of the route control unit 150. As illustrated in FIG. 23, the route control unit 150 includes a DB control unit 151, a route setting unit 152, and an API function unit 153.

The route control unit 150 performs route setting to the deployed pod or issues an instruction on a control policy to the DB 5 in accordance with the determination of the setting policy.

The DB control unit 151 receives deployment/deletion information of a pod from the deployment function unit 160 via the API function unit 153 and transmits the selection logic of the vCPE (e.g. connection of a new client to the selected vCPE or distribution using the equal cost multipath (ECMP) protocol) to the DB 5 at the time of scale-out on the basis of policy information received from the setting policy determination unit 140. At the time of scale-in, information of the vCPE to be scaled in is deleted from the DB 5.

The route setting unit 152 inserts route information (e.g. tunnel setting and PRB information) into the vCPE, VIP, and app pod deployed by the deployment function unit 160.

(Sequence)

Next, a processing sequence in the system of the present embodiment will be described.

<Metric Acquisition Processing>

Figure 24:
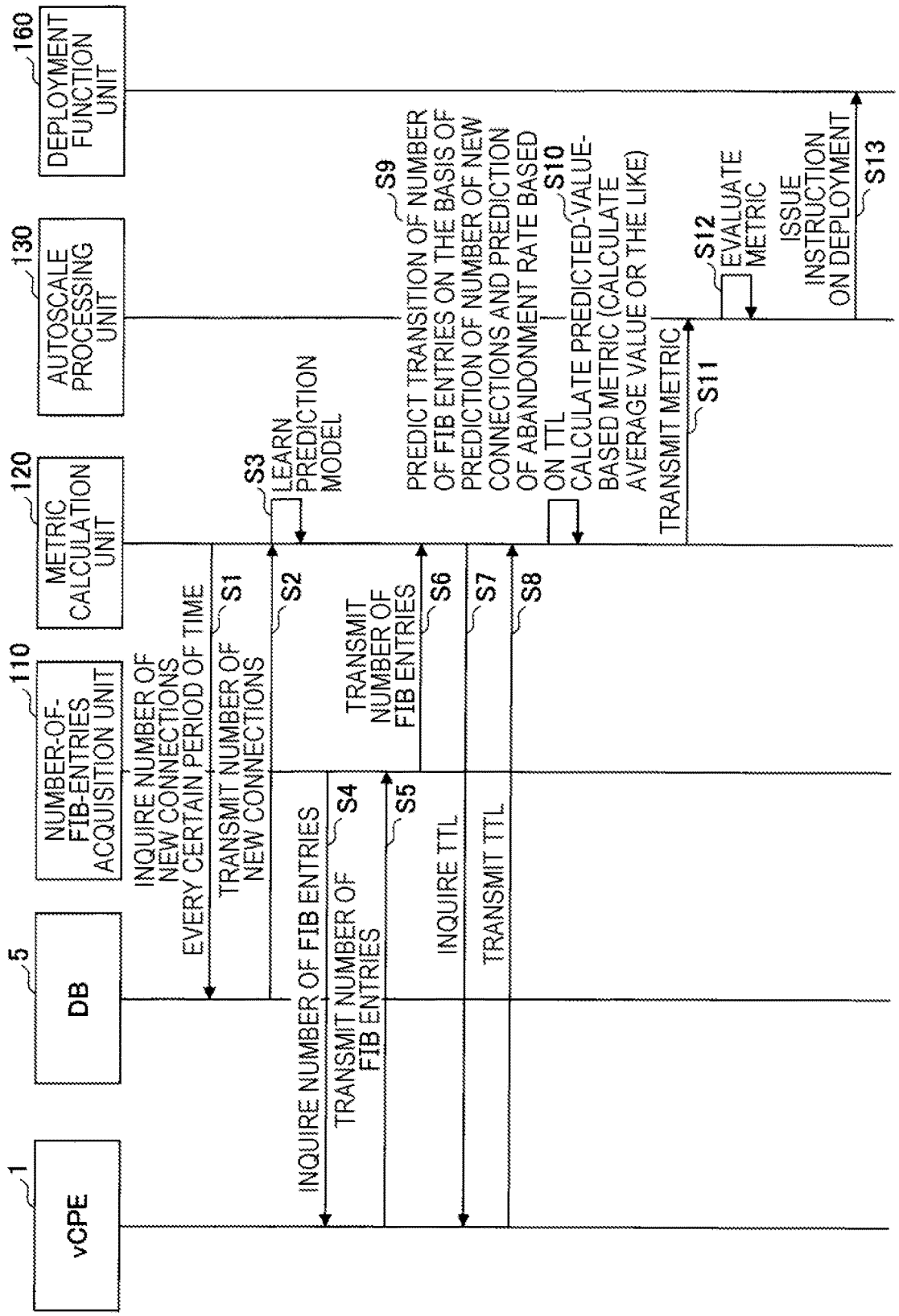
FIG. 24 is a sequence diagram showing metric acquisition processing.

A sequence in metric acquisition processing will be described with reference to FIG. 24. The sequence shows a procedure in which the control device 100 acquires a metric, determines to perform autoscaling, and then additionally deploys a vCPE.

In S1 to S3, the metric calculation unit 120 makes an inquiry to the DB 5, acquires the number of new connections in time series, and generates a prediction model of the number of connections as learning data. The processing in S1 to S3 corresponds to Procedure 1 in S100.

In S4 to S6, the number-of-FIB-entries acquisition unit 110 makes an inquiry to the vCPE 1 and transmits information thereof to the metric calculation unit 120. In S7 to S8, the metric calculation unit 120 acquires the TTL from the vCPE 1. The processing in S4 to S8 corresponds to Procedure 2 in S100.

In S9 to S11, the metric calculation unit 120 calculates a predicted-value-based metric on the basis of the number of current FIB entries, the predicted value of the number of new connections, and the TTL. The metric calculated by the metric calculation unit 120 is transmitted to the autoscale processing unit 130. The processing in S9 to S11 corresponds to Procedure 3 in S100.

In S12 to S13, the autoscale processing unit 130 receives the metric calculated by the metric calculation unit 120, evaluates the metric, and transmits a result thereof to the deployment function unit 160. The processing in S11 to S13 corresponds to Procedure 4 in S100.

<Scale-Out Processing>

Figure 25:
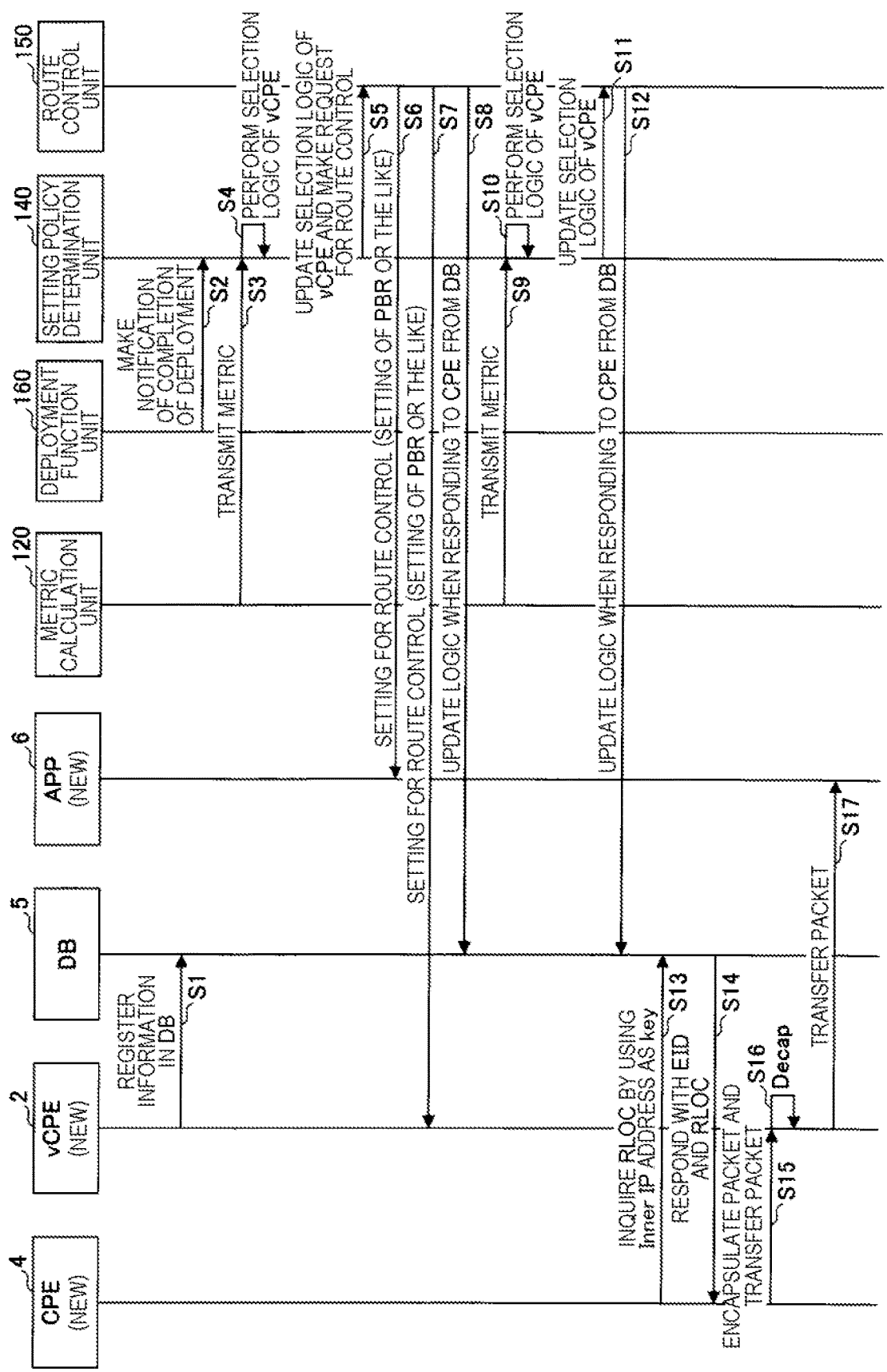
FIG. 25 is a sequence diagram showing scale-out processing.

A sequence in the scale-out processing will be described with reference to FIG. 25. The sequence shows a procedure of processing at the time of scale-out and D-Plane processing.

First, in S1, when the vCPE 2 is newly deployed, information (EID and RLOC) thereof is registered in the DB 5. The processing in S1 corresponds to Procedure 1 in S200-1.

In S2 to S3, the deployment function unit 160 notifies the setting policy determination unit 140 of completion of the deployment, and the metric calculation unit 120 transmits the metric to the setting policy determination unit 140. Thereafter, in S4 to S5, the setting policy determination unit 140 performs the selection logic of the vCPE and transmits a policy to the route control unit 150. The processing in S2 to S5 corresponds to Procedure 2 in S200-1.

In S6 to S7, the route control unit 150 inserts a setting for route control into the vCPE, the application pod, the host, or the like. In S8, the route control unit 150 updates the logic when responding to the CPE 4 in the DB 5. The processing in S6 to S8 corresponds to Procedures 1 and 2 in S300-1.

In S9 to S10, when the FIB entries are balanced between the vCPEs after autoscaling, the setting policy transmission unit 140 updates the selection logic. The processing in S9 to S10 corresponds to Procedure 3 in S200-1.

In S11 to S12, the setting policy transmission unit 140 updates the logic in the DB 5 by transmitting the update result of the selection logic to the route control unit 150. The processing in S11 to S12 corresponds to Procedure 2 in S300-1.

When the C-Plane processing of the autoscale processing in S1 to S12 is completed, a packet can be transferred by the D-Plane. As processing of the D-Plane, in S13 to S14, the CPE 4 makes an inquiry to the DB 5 and learns an encapsulation rule for the opposing vCPE. Specifically, the CPE transmits an inquiry about the RLOC to the DB 5 by using the inner IP address as a key and receives a response of the EID and RLOC from the DB 5. In S15 to S17, the CPE 4 performs encapsulation by using the setting acquired from the DB 5, and thus the packet is transferred to the application pod via the vCPE 2.

<Scale-In Processing>

Figure 26:
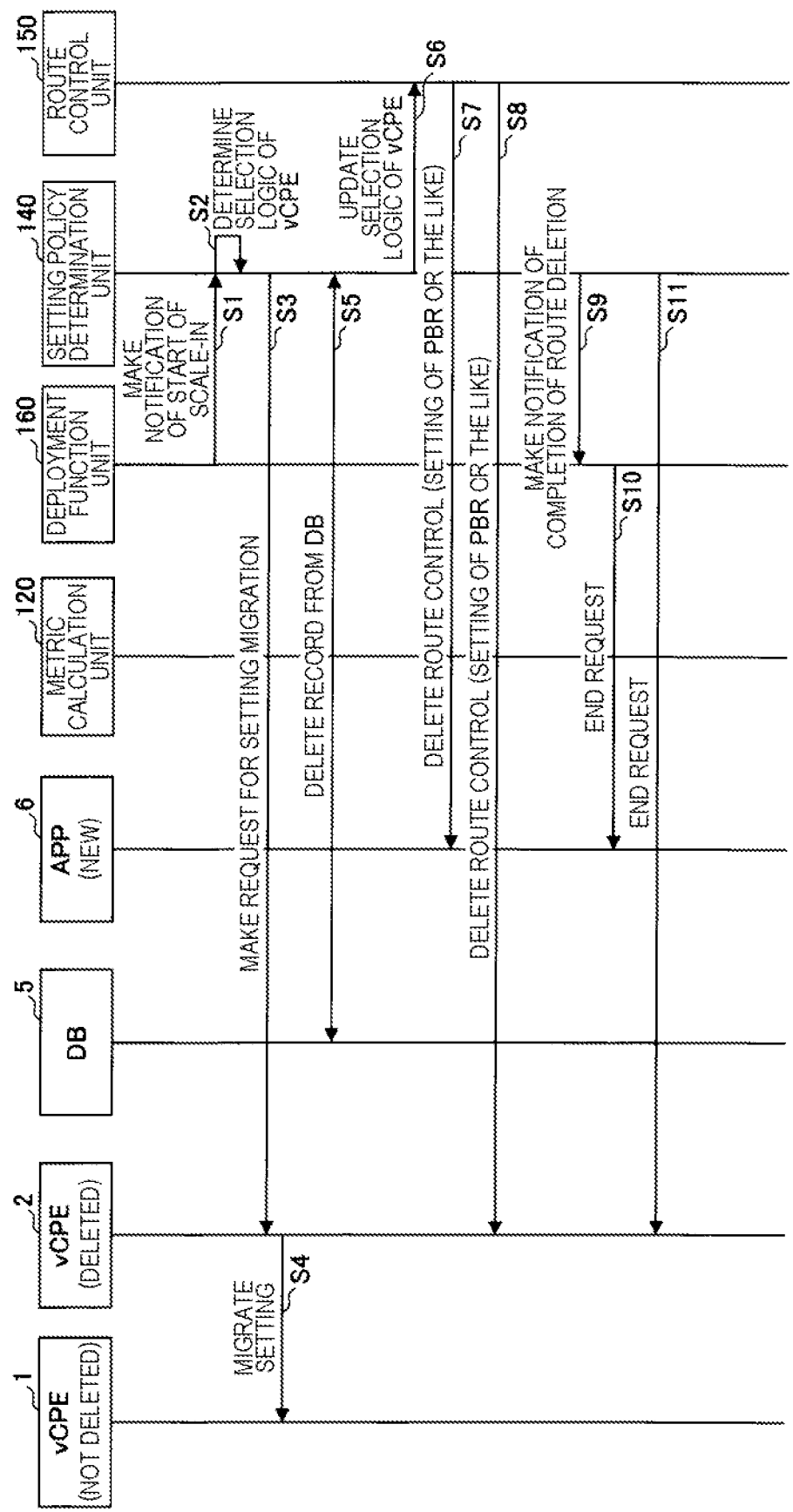
FIG. 26 is a sequence diagram showing scale-in processing.

A sequence in the scale-in processing will be described with reference to FIG. 26. The sequence shows processing at the time of scale-in.

First, in S1 and S2, the deployment function unit 160 notifies the setting policy determination unit 140 of the start of scale-in, and the setting policy determination unit 140 determines the selection logic of the vCPE and executes selection. The processing in S1 to S2 corresponds to Procedure 1 in S200-2.

In S3 to S4, the setting policy determination unit 140 that has executed the selection transmits a request for the setting migration to the vCPE 2 and migrates the setting from the vCPE 2 to be deleted to another vCPE 1. The processing in S3 to S4 corresponds to Procedure 2 in S200-2.

After the setting is migrated, the setting policy determination unit 140 changes the route in S5 to S8. That is, the setting policy determination unit deletes a target record from the DB 5 in S5, notifies the route control unit 150 of the update of the selection logic of the vCPE in S6, and deletes the route and the tunnel setting in S7 and S8. The processing in S5 to S8 corresponds to Procedure 1 in S300-2.

When the deletion of the route is completed in S9 to S11, the deployment function unit 160 deletes the application pod 6 and vCPE 2 to be deleted. The processing in S9 to S11 corresponds to Procedure 2 in S300-2.

(Hardware Configuration Example)

The control device 100 can be implemented by, for example, causing one or a plurality of computers to execute a program. The computers may be physical computers or virtual machines.

Specifically, the control device 100 can be implemented by executing a program corresponding to processing to be performed in the control device 100 by using hardware resources such as a central processing unit (CPU) and a memory installed in the computer. The above program can be stored and distributed by being recorded in a computer-readable recording medium (e.g. portable memory). The above program can also be provided through a network such as the Internet or an electronic mail.

Figure 27:
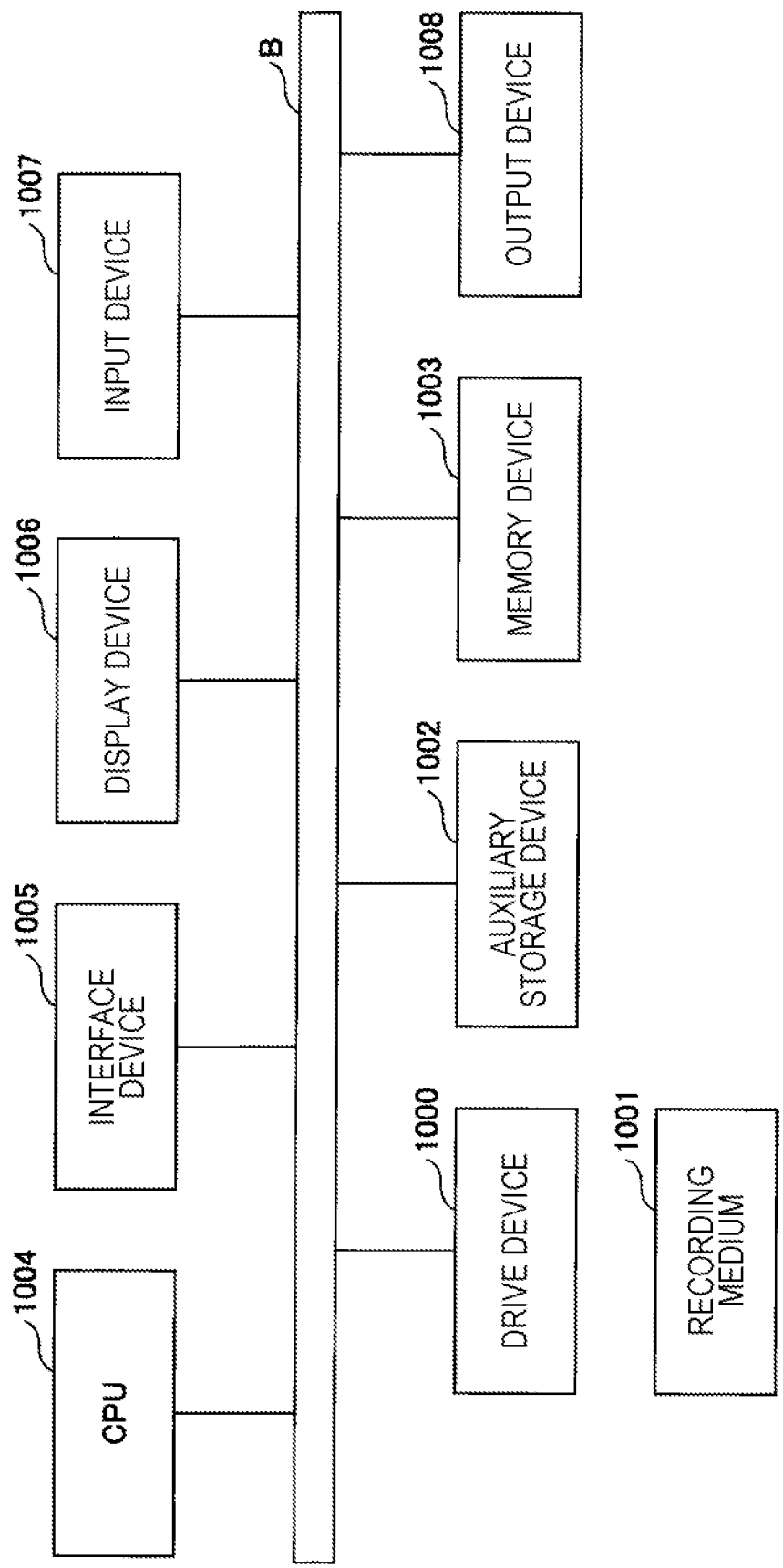
FIG. 27 illustrates a hardware configuration example of a device.

FIG. 27 illustrates a hardware configuration example of the computer. The computer in FIG. 27 includes a drive device 1000, an auxiliary storage device 1002, a memory device 1003, a CPU 1004, an interface device 1005, a display device 1006, an input device 1007, and the like, which are connected to one another by a bus B.

The program for implementing the processing in the computer is provided by, for example, a recording medium 1001 such as a compact disc read only memory (CD-ROM) or a memory card. When the recording medium 1001 storing the program is set in the drive device 1000, the program is installed from the recording medium 1001 to the auxiliary storage device 1002 via the drive device 1000. However, the program is not necessarily installed from the recording medium 1001 and may be downloaded from another computer via a network. The auxiliary storage device 1002 stores the installed program and also stores necessary files, data, and the like.

In a case where an instruction to start the program is issued, the memory device 1003 reads and stores the program from the auxiliary storage device 1002. The CPU 1004 implements a function related to the control device 100 in accordance with the program stored in the memory device 1003. The interface device 1005 is used as an interface for connecting to the network and functions as input means and output means via the network. The display device 1006 displays a graphical user interface (GUI) or the like by the program. The input device 157 includes a keyboard, mouse, button, touchscreen, or the like and is used to input various operation instructions.

Effects and the Like of Embodiment

As described above, according to the present embodiment, autoscaling is performed when the number of tunneling settings increases, and the settings are distributed between the plurality of vCPEs. This makes it is possible to avoid a decrease in throughput even when the number of clients increases.

In the present embodiment, instead of an actual number of FIB entries, a predicted value of the number of future FIB entries calculated based on a predicted value of the number of connections, the TTL, and the like is used as a metric used for determining whether to perform autoscaling. This makes it possible to perform proactive scheduling.

In the intra-cluster routing control, conventionally, the number of routes to the vCPEs explosively increases corresponding to the number of CPEs, which causes a problem in scalability. However, the present embodiment implements a scalable architecture by reducing the number of routes by fixing vCPEs used for each application.

Summary of Embodiment

The present specification discloses at least a control device, network control method, and program in the following items.

(Item 1)
A control device that controls a communication system in which a network device and a virtual network device on a cloud communicate with each other through a tunnel, the control device including:

a calculation unit that calculates a predicted value of the number of future setting entries in the virtual network device;

an autoscale execution unit that executes scale-out or scale-in of the virtual network device on the basis of a result of comparison between the predicted value and a threshold; and a control unit that performs routing control between an application and the virtual network device in a service platform on the cloud.

(Item 2)
The control device according to item 1, in which the calculation unit calculates the predicted value of the number of setting entries on the basis of a predicted value of the number of future new clients, the number of current setting entries, and a TTL of each of the current setting entries.

(Item 3)
The control device according to item 1 or 2, in which in the scale-out, the control unit inserts a tunnel setting for a new client into a virtual network device having the smallest number of setting entries.

(Item 4)
The control device according to item 3, in which the control unit reselects a virtual network device into which the tunnel setting for the new client is inserted after the number of setting entries of each virtual network device is balanced.

(Item 5)
The control device according to any one of items 1 to 4, in which in the scale-in, the control unit performs control to migrate an existing tunnel setting in a virtual network device to be deleted to one or more existing virtual network devices in descending order of the number of setting entries.

(Item 6)
The control device according to any one of items 1 to 5, in which in a case where the scale-out of the virtual network device is executed in the service platform on the cloud, the control unit performs a routing setting between a newly installed virtual network device and an application, and, in a case where the scale-in of the virtual network device is executed, the control unit deletes a routing setting between a deleted virtual network device and the application.

(Item 7)
A network control method performed by a control device that controls a communication system in which a network device and a virtual network device on a cloud communicate with each other through a tunnel, the network control method including:

a step of calculating a predicted value of the number of future setting entries in the virtual network device;

a step of executing scale-out or scale-in of the virtual network device on the basis of a result of comparison between the predicted value and a threshold; and a step of performing routing control between an application and the virtual network device in a service platform on the cloud.

(Item 8)
A program for causing a computer to function as each unit in the control device according to any one of items 1 to 6.

Although the present embodiment has been described above, the present invention is not limited to such a specific embodiment, and various modifications and changes can be made within the scope of the gist of the present invention described in the claims.

REFERENCE SIGNS LIST 1, 2, 3 vCPE
4 CPE
5 DB
6 App
100 Control device
110 Number-of-FIB-entries acquisition unit
111 Acquisition API function unit
112 FB entry DB
113 Distribution API function unit
120 Metric calculation unit
121 Number-of-clients statistical information DB
122 Prediction model unit
123 TTL acquisition unit
124 Metric calculation processing unit
125 Metric calculation parameter DB
130 Autoscale processing unit
131 Autoscale processing unit parameter DB
132 Threshold determination unit
133 API function unit
134 Threshold decision unit
140 Setting policy determination unit
141 Setting policy determination parameter DB
142 vCPE selection unit
143 Migration destination determination unit
144 API function unit
150 Route control unit
151 DB control unit
152 Route setting unit
153 API function unit
160 Deployment function unit
1000 Drive device
1001 Recording medium
1002 Auxiliary storage device
1003 Memory device
1004 CPU
1005 Interface device
1006 Display device
1007 Input device

The invention claimed is:

1. A control device that controls a communication system in which a network device and a virtual network device on a cloud communicate with each other through a tunnel, the control device comprising:
a memory; and
a processor coupled to the memory and configured to:
calculate a predicted value of a number of future setting entries in the virtual network device;
execute scale-out or scale-in of the virtual network device based on a result of comparison between the predicted value and a threshold; and
perform routing control between an application and the virtual network device in a service platform on the cloud, wherein
in the scale-out, the processor is configured to insert a tunnel setting for a new client into the virtual network device having a smallest number of setting entries.

2. The control device according to claim 1, wherein the processor is configured to calculate the predicted value of the number of the future setting entries based on a predicted value of a number of future new clients, a number of current setting entries, and a time to live (TTL) of each of the current setting entries.

3. The control device according to claim 1, wherein the processor is configured to reselect the virtual network device into which the tunnel setting for the new client is inserted after a number of setting entries of each virtual network device is balanced.

4. The control device according to claim 1, wherein in a case where the scale-out of the virtual network device is executed in the service platform on the cloud, the processor is configured to perform a routing setting between a newly installed virtual network device and an application, and, in a case where the scale-in of the virtual network device is executed, the processor is configured to delete a routing setting between the virtual network device to be deleted and the application.

5. A control device that controls a communication system in which a network device and a virtual network device on a cloud communicate with each other through a tunnel, the control device comprising:
a memory; and
a processor coupled to the memory and configured to:
calculate a predicted value of a number of future setting entries in the virtual network device;
execute scale-out or scale-in of the virtual network device based on a result of comparison between the predicted value and a threshold; and
perform routing control between an application and the virtual network device in a service platform on the cloud, wherein
in the scale-in, the processor is configured to perform control to migrate an existing tunnel setting in the virtual network device to be deleted to one or more existing virtual network devices in descending order of a number of setting entries.

6. The control device according to claim 5, wherein the processor is configured to calculate the predicted value of the number of the future setting entries based on a predicted value of a number of future new clients, a number of current setting entries, and a time to live (TTL) of each of the current setting entries.

7. The control device according to claim 5, wherein in a case where the scale-out of the virtual network device is executed in the service platform on the cloud, the processor is configured to perform a routing setting between a newly installed virtual network device and an application, and, in a case where the scale-in of the virtual network device is executed, the processor is configured to delete a routing setting between the virtual network device to be deleted and the application.

8. A network control method performed by a control device that controls a communication system in which a network device and a virtual network device on a cloud communicate with each other through a tunnel, the network control method comprising:
calculating a predicted value of a number of future setting entries in the virtual network device;
executing scale-out or scale-in of the virtual network device based on a result of comparison between the predicted value and a threshold; and
performing routing control between an application and the virtual network device in a service platform on the cloud, wherein
in the scale-out, a tunnel setting for a new client is inserted into the virtual network device having a smallest number of setting entries.

9. A non-transitory computer-readable recording medium storing a program for causing a computer to perform the network control method of claim 8.

* * * * *